US007644367B2

(12) United States Patent
McKeon et al.

(10) Patent No.: US 7,644,367 B2
(45) Date of Patent: Jan. 5, 2010

(54) USER INTERFACE AUTOMATION FRAMEWORK CLASSES AND INTERFACES

(75) Inventors: Brendan McKeon, Seattle, WA (US); Robert Sinclair, Sammamish, WA (US); Patricia M Wagoner, Redmond, WA (US); Paul J. Reid, Woodinville, WA (US); Michael A. Friedman, Sammamish, WA (US); Heather S. Burns, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 676 days.

(21) Appl. No.: 10/439,514

(22) Filed: May 16, 2003

(65) Prior Publication Data

US 2004/0229200 A1    Nov. 18, 2004

(51) Int. Cl.
    *G06F 3/00*    (2006.01)
(52) U.S. Cl. ..................................... 715/762; 715/747
(58) Field of Classification Search .................. 715/762; 345/747
    See application file for complete search history.

(56) References Cited

U.S. PATENT DOCUMENTS

| 5,327,529 A | * | 7/1994 | Fults et al. .................. 715/762 |
| 5,537,548 A | | 7/1996 | Fin et al. |
| 5,600,778 A | * | 2/1997 | Swanson et al. ............ 715/762 |
| 5,613,122 A | * | 3/1997 | Burnard et al. .............. 713/1 |
| 5,627,958 A | | 5/1997 | Potts |
| 5,634,002 A | | 5/1997 | Polk et al. |
| 5,642,511 A | | 6/1997 | Chow et al. |
| 5,893,116 A | | 4/1999 | Simmonds et al. |
| 5,898,434 A | | 4/1999 | Small et al. |

(Continued)

FOREIGN PATENT DOCUMENTS

EP    1156427 A2    11/2001

(Continued)

OTHER PUBLICATIONS

Calum Benson et al., "Gnome Accessibility for Developers (CVS draft)," Internet document, Oct. 16, 2002, retrieved from the Internet at: URL:http://web.archive.org/web/20030201192710/ http://developer.gnome.org/projects/gap/guide/gad/index.html>; pp. 3-6.

(Continued)

*Primary Examiner*—William L Bashore
*Assistant Examiner*—David Phantana-angkool
(74) *Attorney, Agent, or Firm*—Shook, Hardy & Bacon, L.L.P.

(57) ABSTRACT

A method and system providing a client with user interface information are described. The method and system implement a set of application program interfaces for providing user interface information to a client through an accessibility system. The accessibility system includes a mechanism for transferring user interface information from a provider side to the client side and a logical tree for selectively revealing user interface information. The application program interface system includes client side application program interfaces for assisting the client in obtaining user interface information. The client side application program interfaces include an automation class, a logical element class, a raw element class, control pattern classes, and an input class. The provider side application program interfaces include a provider automation class, a provider automation interface, a raw element interface, and control pattern provider interfaces.

54 Claims, 10 Drawing Sheets

U.S. PATENT DOCUMENTS

| | | | |
|---|---|---|---|
| 5,905,492 A * | 5/1999 | Straub et al. | 715/744 |
| 5,923,328 A * | 7/1999 | Griesmer | 715/854 |
| 5,933,824 A | 8/1999 | DeKoning | |
| 5,953,724 A | 9/1999 | Lowry | |
| 6,029,170 A | 2/2000 | Garger | |
| 6,055,515 A | 4/2000 | Consentino et al. | |
| 6,104,391 A * | 8/2000 | Johnston et al. | 715/745 |
| 6,144,377 A | 11/2000 | Oppermann et al. | |
| 6,161,126 A | 12/2000 | Wies et al. | |
| 6,188,399 B1 * | 2/2001 | Voas et al. | 715/723 |
| 6,262,435 B1 | 7/2001 | Plat et al. | |
| 6,263,260 B1 | 7/2001 | Bodmer | |
| 6,263,360 B1 * | 7/2001 | Arnold et al. | 709/203 |
| 6,334,157 B1 | 12/2001 | Oppermann et al. | |
| 6,341,280 B1 | 1/2002 | Glass | |
| 6,348,935 B1 | 2/2002 | Malacinski | |
| 6,363,435 B1 | 3/2002 | Fernando | |
| 6,532,023 B1 | 3/2003 | Schumacher | |
| 6,559,871 B1 | 5/2003 | Brozowski et al. | |
| 6,622,298 B1 * | 9/2003 | Stamm | 717/125 |
| 6,662,312 B1 * | 12/2003 | Keller et al. | 714/38 |
| 6,664,981 B2 * | 12/2003 | Ashe et al. | 715/765 |
| 6,690,356 B2 * | 2/2004 | Johnston et al. | 345/157 |
| 6,701,514 B1 * | 3/2004 | Haswell et al. | 717/115 |
| 6,710,782 B2 * | 3/2004 | Ruff et al. | 345/619 |
| 6,731,310 B2 * | 5/2004 | Craycroft et al. | 715/765 |
| 6,948,152 B2 * | 9/2005 | Dubovsky | 717/124 |
| 6,961,873 B2 * | 11/2005 | Dubovsky | 714/38 |
| 6,996,800 B2 * | 2/2006 | Lucassen et al. | 717/106 |
| 7,010,793 B1 | 3/2006 | Chatterjee et al. | |
| 7,020,847 B1 | 3/2006 | Holzheuer | |
| 7,058,890 B2 | 6/2006 | George et al. | |
| 7,197,546 B1 * | 3/2007 | Bagga et al. | 709/223 |
| 7,337,405 B2 * | 2/2008 | Weng et al. | 715/748 |
| 7,356,472 B2 * | 4/2008 | Cross et al. | 704/270.1 |
| 7,421,645 B2 * | 9/2008 | Reynar | 715/206 |
| 7,448,041 B2 * | 11/2008 | Creamer et al. | 719/311 |
| 2001/0028359 A1 | 10/2001 | Muraishi et al. | |
| 2003/0046316 A1 * | 3/2003 | Gergic et al. | 707/513 |
| 2003/0063120 A1 | 4/2003 | Wong et al. | |
| 2003/0067485 A1 * | 4/2003 | Wong et al. | 345/747 |
| 2003/0151633 A1 | 8/2003 | George et al. | |
| 2003/0184588 A1 | 10/2003 | Lee | |
| 2004/0003091 A1 | 1/2004 | Coulthard et al. | |
| 2004/0003119 A1 | 1/2004 | Munir et al. | |
| 2004/0003348 A1 | 1/2004 | Ostertag et al. | |
| 2004/0003349 A1 | 1/2004 | Ostertag et al. | |
| 2004/0003371 A1 | 1/2004 | Coulthard et al. | |
| 2004/0064593 A1 | 4/2004 | Sinclair et al. | |
| 2004/0123239 A1 | 6/2004 | Roessler | |
| 2005/0050011 A1 | 3/2005 | Van Der Linden et al. | |
| 2005/0086608 A1 | 4/2005 | Roessler | |

FOREIGN PATENT DOCUMENTS

| | | |
|---|---|---|
| RU | 22281 | 3/2002 |
| RU | 2192049 C1 | 10/2002 |
| WO | WO 9716796 A1 | 5/1997 |
| WO | 9744729 A1 | 11/1997 |
| WO | 0243353 A2 | 5/2002 |
| WO | 03069500 A1 | 8/2003 |

OTHER PUBLICATIONS

Andreas Zeller et al., "DDD—A Free Graphical Front-End for UNIX Debuggers", ACM SIGPLAN Notices, Association lor Computing Machinery, New York, Jan. 1996, pp. 22-27, vol. 31. No. 1.

(No. Author listed), "Reflections," an Internet document, URL: http://www.freshsources.com/Aug01.pds<, Aug. 2001, 13 pp.

Chuck Allison, "Articles," from the C/C++ Users Journal (Arranged by Programming Language), an Internet document, URL: http://www.freshsources.com/>, Jan. 26, 2005, 3 pp.

David Platt, "The COM + Event Service Eases the Pain of Publishing and Subscribing to Data," Microsoft Systems Journal, Sep. 1999, 23 pp.

Vogtle et al, "A Critical Interface: Occupational Therapy, Engineering and Assistive Technology," IEEE, Proceedings of the 22nd Annual EMBS International Conference, Jul. 23-28, 2000, Chicago, Illinois, pp. 2379-2382.

Greenberg et al., ''Customizable Physical Interfaces for Interacting With Conventional Applications,' UIST 2002, Oct. 27-30, 2002, Paris, France,vol. 4, Issue 2, pp. 31-40.

Memon et al., "Hierarchical GUI Test Case Generation Using Automated Planning," IEEE 2001, Pittsburgh, PA, pp. 144-155.

John Zukowski, "Java AWT Reference," O'Reilly Online Catalog, Mar. 1997, Chapter 4, pp. 94-158.

Dmitri Klementiev, "Software Driving Software: Active Accessibility-Compliant Apps Give Programmers New Tools to Manipulate Software," Apr. 29, 2004, pp. 1-15, http://msdn.microsoft.com/msdnmag/issues/0400/aascess/default.aspx.

* cited by examiner

USER INTERFACE AUTOMATION FRAMEWORK CLASSES AND INTERFACES

CROSS REFERENCE TO RELATED APPLICATIONS

Not applicable.

STATEMENT REGARDING FEDERALLY SPONSORED RESEARCH OR DEVELOPMENT

Not Applicable.

TECHNICAL FIELD

The invention relates to the field of assistive technology, automated testing, and other products, which collect user interface information and the interaction of these products with user interface information.

BACKGROUND OF THE INVENTION

Assistive technology (AT) products exist to help computer users who have a need for assistance in areas of learning, communication and access to information contained in and presented by computer software. These products have a need for information relevant to the computer interface. Similarly, existing automated testing products and user interface commanding utilities also have a need for information about the user interface. Currently, these products have no sufficient source of user interface (UI) information. These three types of products (clients) are required to have necessary support from elsewhere to enable them to: (1) gather information about an application's user interface; (2) programmatically discover and interrogate UI elements regardless of the technology used to build the UI; (3) generate keyboard and pointer input; and (4) understand what type of behavior or functionality is currently available. No single technology is available currently that gives an AT product all of these capabilities. Furthermore, current AT products are not always compatible with all graphical operating system (OS) technologies and lack the ability to filter and coordinate redundant or misleading notifications in a centralized way. An additional disadvantage is that current automation and accessibility infrastructures are not extensible and therefore require OS level changes to add new functionality.

Furthermore, currently to gather information about an application's user interface, the AT product must write application-specific code to obtain information for the user. The process of writing this application-specific code is time consuming and requires continuous maintenance. Current automation infrastructure also lacks the ability to filter and coordinate redundant or misleading event notifications in a consistent manner. Thus, event consumers are required to independently filter information.

Current systems allow AT products to request event notifications in three levels of granularity: (1) everything on a desktop; (2) in a particular process (such as opening of a word processor); or (3) in a thread in the particular process (multiple objects doing work in the process). Currently, when the client receives an event, it receives a window handle for a specific window in which the event occurred and other bits of information to indicate where the event occurred. A client can make a cross process call to retrieve the UI object that is related to the event. With this object, the client can make additional cross process calls to ask for information about that object. If the client needs five pieces of information, then the client must make five cross process calls. Cross process calls are exceedingly slow, so the performance cost of collecting UI information using current accessibility infrastructure is high. This type of known scenario is shown in FIG. 8. A server application 12 fires an event 6. A kernel 14 determines which clients must be notified and sends an event notification 18 to an interested client 10. The client 10 makes a request 16 from the server application 12 across a process boundary 2 for the object related to the event notification 18. The server application 12 returns the object 20 and then the client 10 can begin sending requests 16 for information about the UI control that fired the event. The server application 12 returns the requested information 20 across the process boundary 2 to the client 10.

Another current option allows client code to be loaded as a dynamic link library (.DLL) within a process. This option has several drawbacks. First, it requires cooperation from the system to load client code into a process. Second, it gives rise to security issues because once in the client code is loaded into an application's process, it is difficult to restrict the information it gathers. Third, to be an effective technique for the client, it must be loaded into every process on the system. Optimally, only trusted clients should be loaded into another application's process.

Furthermore, a system is needed that gives the client the ability to specify what event notifications it wants to receive. In known systems, a client may need to make a number of cross process calls and then analyze the information to determine if it is interested in the event. A mechanism is needed that can perform this event filtering in a more performant manner and that can be easily updated to support new system or application events. Furthermore, a system is needed that uses only trusted components in order to alleviate security concerns.

Currently, when seeking information about a user interface, the AT product is required to access trees that are native to a particular UI framework. Accordingly, multiple trees are required to convey user interface information for multiple UI frameworks. These differing trees may contain information that is not of interest or is not visible to the user, such as hidden container objects that manage the visible UI controls manipulated by the end user. Therefore, a need exists for a single unified tree having only those nodes that are of interest to the user.

A solution is needed that addresses the needs of AT products, automated testing tools, and commanding utilities. The solution should be usable by all graphical OS technologies and should allow all forms of UI and UI components to become accessible.

BRIEF SUMMARY OF THE INVENTION

The present invention is directed to a method and computer application for providing a client with user interface information. In one aspect of the invention a system of tools is provided for use in an accessibility system that provides a client with user interface information. The accessibility system includes a client side and a provider side. The system of tools includes client side automation tools including a client automation class for seeking user interface information. The client automation class includes event registration tools and logical element discovery tools. The set of tools further includes provider side automation tools for providing the client with user interface information. The provider side automation tools include an automation provider class having tools for providing the client with event information.

In a further aspect, the set of client side tools may include a client side automation mechanism including a client automation class for seeking user interface event information from the provider side and a client side logical element mechanism including a logical element class for representing a user interface element in the logical tree.

In yet an additional aspect, the provider tools include a provider side automation class including tools for providing event notifications to the client and a provider side automation interface for exposing user interface properties. The provider side tools additionally include a raw element interface for returning information related to a specific relative element and a raw element context interface for managing events and functionality not related to a specific element.

In an additional aspect, the invention includes an application program interface system for providing user interface information to a client through an accessibility system. The accessibility system includes a mechanism for transferring user interface information from a provider side to the client side and a logical tree for selectively revealing user interface information. The application program interface system includes client side application program interfaces for assisting the client in obtaining user interface information. The client side application program interfaces include an automation class, a logical element class, a raw element class, control pattern classes, and an input class. The provider side application program interfaces include a provider automation class, a provider automation interface, a raw element interface, and control pattern provider interfaces.

In an additional aspect, the invention includes a computer-implemented method for providing user interface information to a client through an accessibility system. The method includes providing client side application program interfaces for assisting the client in obtaining user interface information, wherein the client side application program interfaces include an automation class, a logical element class, a raw element class, control pattern classes, and an input class. The method additionally includes supplying provider side application program interfaces for responding to client requests, the provider side application program interfaces including a provider automation class, a provider automation interface, a raw element interface, and control pattern provider interfaces.

In yet an additional aspect, the invention includes a computer-implemented method for providing user interface information to a client through an accessibility system. The method includes requesting user interface information using a selected event handler from a client automation class and includes a method for a provider to provide user interface event notifications using a corresponding raise event method.

Additional advantages and novel features of the invention will be set forth in the description which follows, and in part will become apparent to those skilled in the art upon examination of the following, or may be learned from practice of the invention.

BRIEF DESCRIPTION OF THE DRAWINGS

The present invention is described in detail below with reference to the attached drawing figures, wherein.

DETAILED DESCRIPTION OF THE INVENTION

Exemplary Operating Environment

Figure 1:
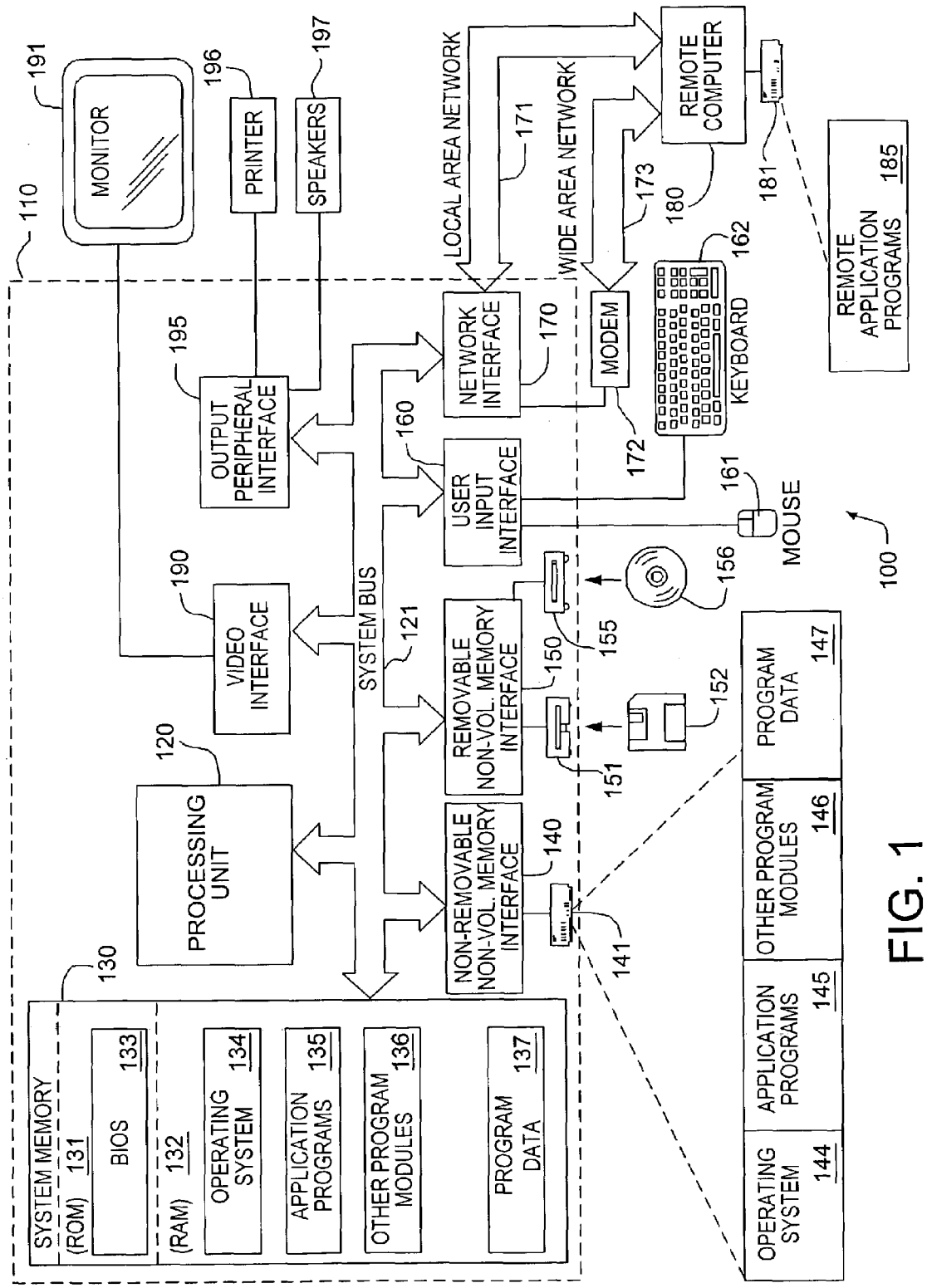
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Accessibility System Structure

Figure 2:
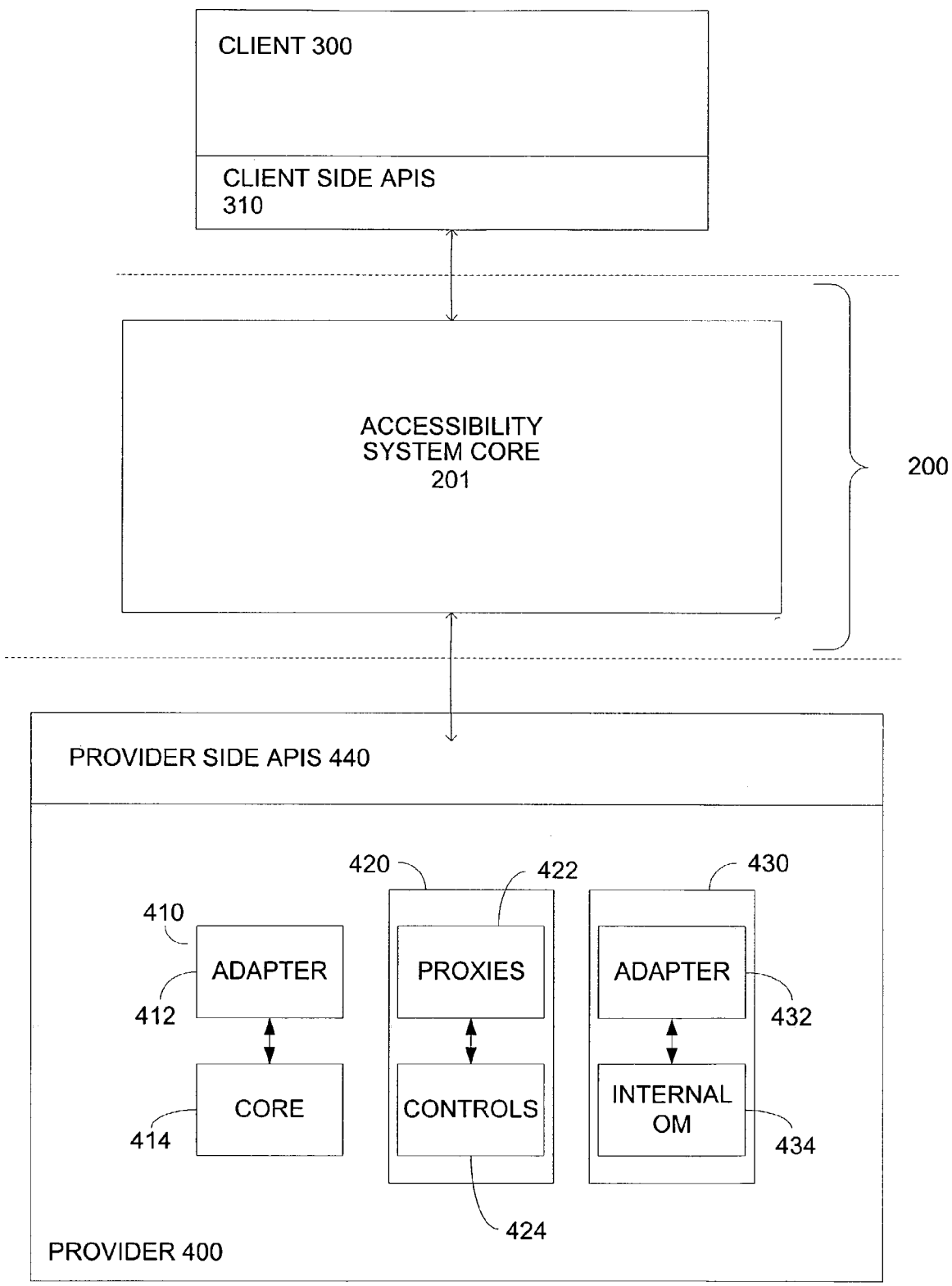
FIG. 2 is a block diagram of interaction between an accessibility system, a client environment, and a server environment.

As shown in FIG. 2, an accessibility system 200 interacts with a client environment 300 and a server environment 400. The accessibility system 200 may be implemented in the computer environment 100 described above with respect to FIG. 1. The accessibility system 200 includes a client side accessibility interface 220 for facilitating interaction with the client 300, a server side accessibility interface 230 for facilitating interaction with the server side 400, and an accessibility system core 201. The accessibility system 200 of the invention provides new application program interfaces (APIs) including client side APIs 305 and provider side APIs 440 for programmatically accessing a user interface (UI). The accessibility system 200 allows applications to make themselves and any components they use accessible.

The client environment 300 preferably includes an assistive technology (AT) product or automated UI testing tool. The server side 400 may implement a variety of different technologies as shown in FIG. 2. A server system 410 includes an adapter 412 and a core 414, which may be found in a first type of UI. A server system 420 includes a proxies component 422 and controls 424 as may be found in a second type of UI, such as a Win32 UI available in Microsoft Operating System products, from the Microsoft Corporation of Redmond, Wash. The server system 430 includes an adapter 432 and an internal OM 434, which may be found in an alternative third type of UI.

Figure 3:
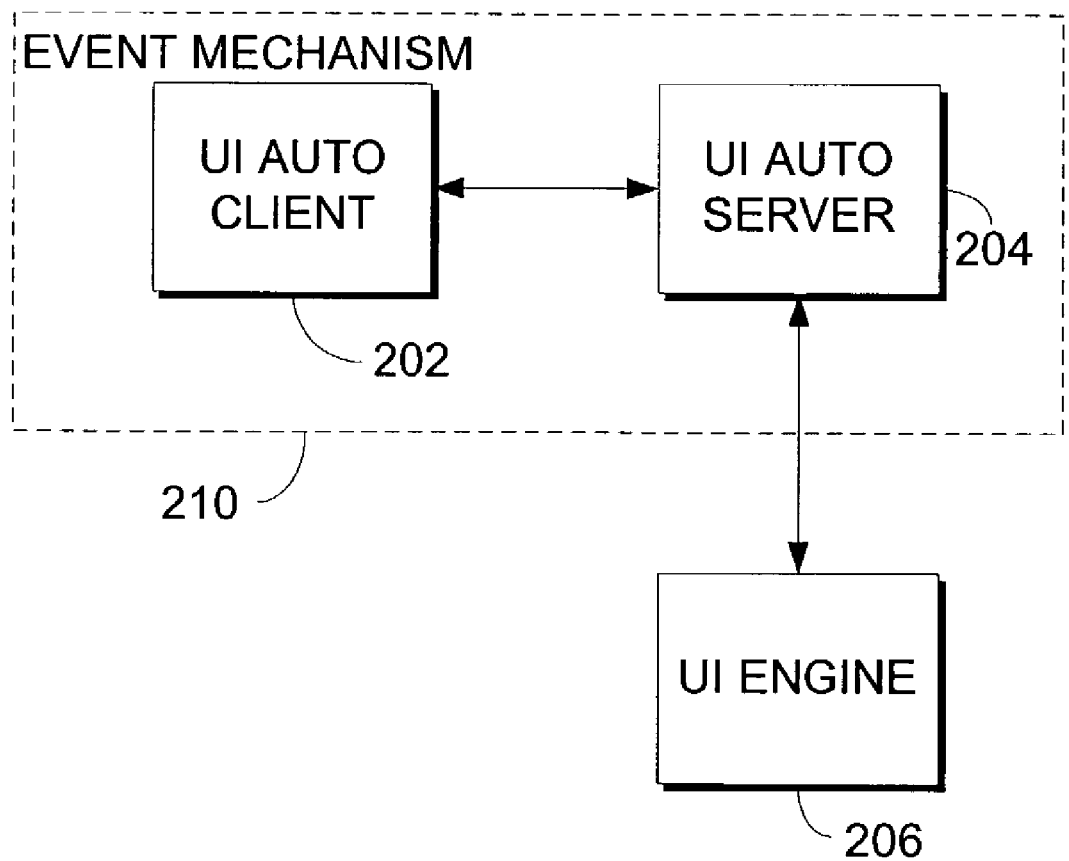
FIG. 3 is a block diagram illustrating components of the accessibility system core.

As shown in FIG. 3, an event mechanism 210, which is included in the accessibility system 200, relies on a UI automation client 202 and a UI automation server 204 for facilitating interaction with the client environment 300 and the server environment 400. The UI automation client 202 and the UI automation server 204 are described in greater detail below with reference to the events mechanism 210 of the invention. The accessibility system 200 of the invention gives the client (AT Product) 300 the capability to: (1) gather information about an application's user interface; (2) programmatically discover and interrogate UI elements regardless of the technology used to build the UI; (3) generate keyboard and pointer input; and (4) understand what type of behavior or functionality is currently available. The accessibility system 200 allows applications to make themselves and their components accessible. The structure shown in FIGS. 2 and 3 enables several major aspects of the accessibility system 200 including: (1) logical UI tree; (2) Control Patterns; (3) Event Mechanism; (4) properties; and (5) client and server side APIs, all of which are further described below.

UI Access Logical Tree 222

Figure 4A:
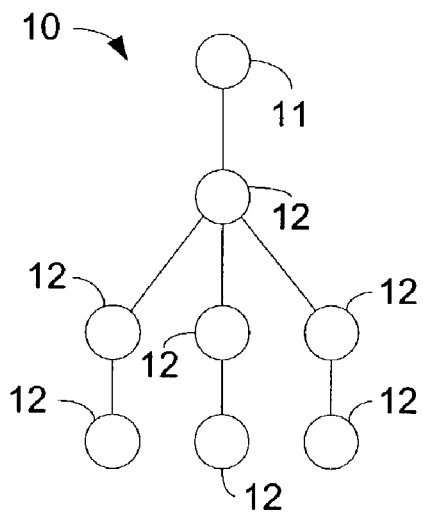
FIGS. 4(A)-4(D) illustrate the creation of a logical tree from native elements.
Figure 4A:
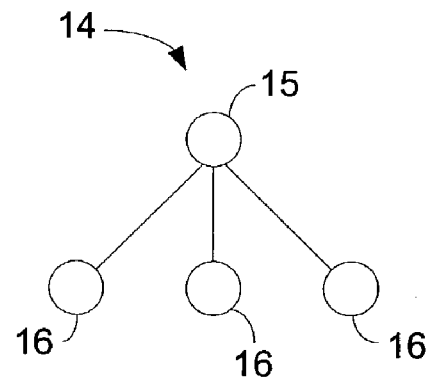
Figure 4B:
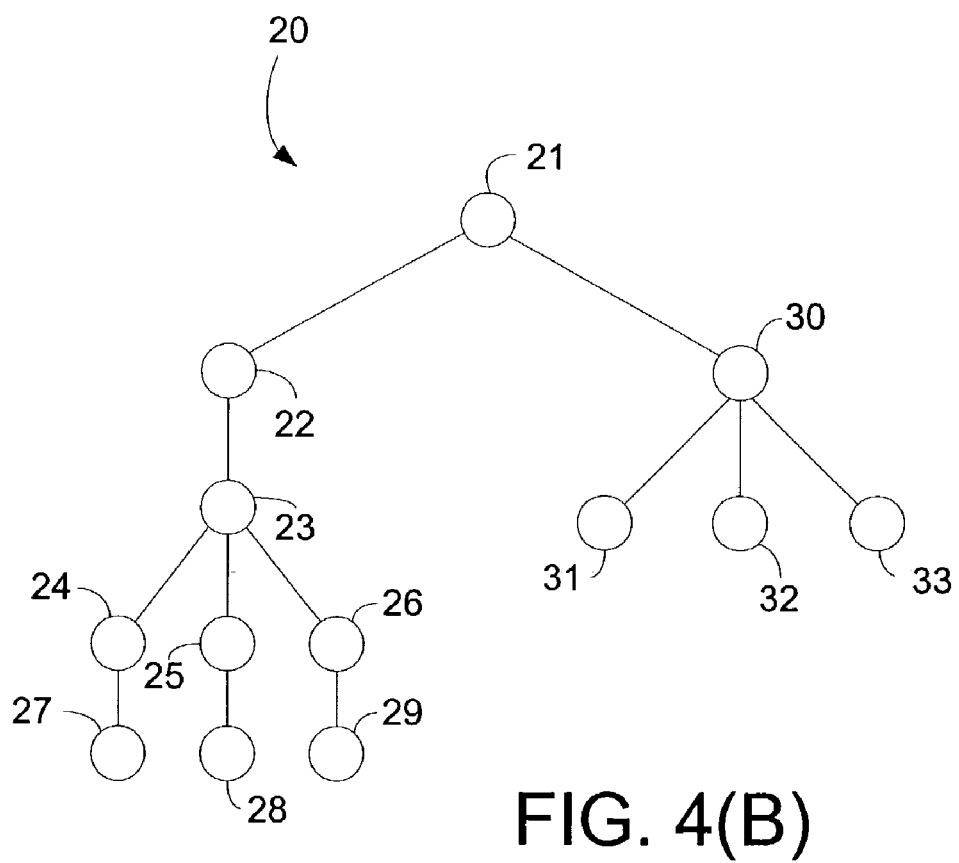
Figure 4C:
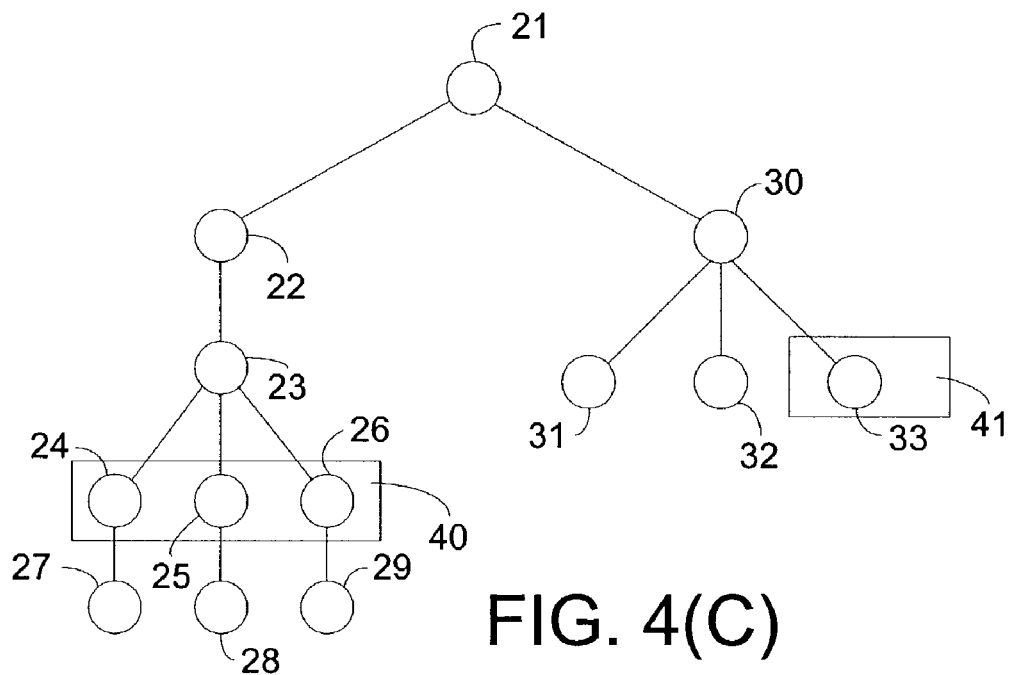
Figure 4D:
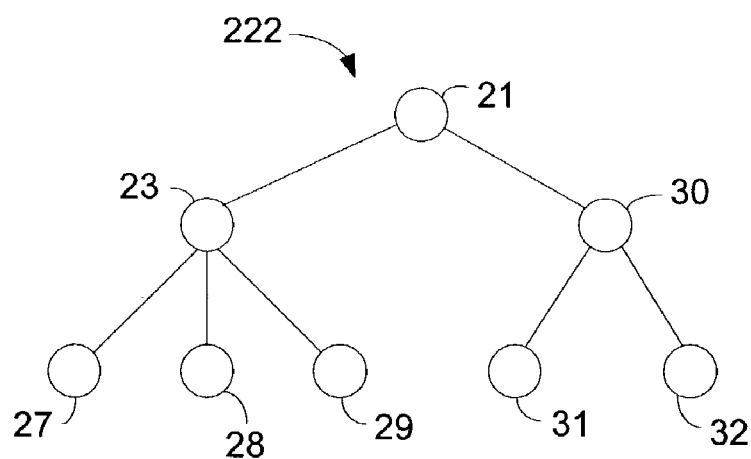

An integral component of the accessibility system 200 is the logical tree 222, an example of which is shown in FIG. 4(D). The tree 222 is included in the client side accessibility interface 220.

The logical tree 222 is a filtered view of the underlying structural hierarchy of UI elements, not a separate tree that must be implemented by the control or application developer. Instead, it keys off a few well-defined properties, interesting and uninteresting, which indicate whether a structural element should be exposed in the logical tree 222. The accessibility system core 201 consumes this information to produce the filtered UI logical tree 222 that is, in turn, presented to the AT products or test script.

The logical tree 222 is a tree of elements, each of which represents a control, an item in a control, or a grouping structure, which may be a dialog, pane, or frame. The structure of the logical tree 222 should represent the UI of the application as perceived by the user (even if the controls are actually implemented using a different underlying structure). The tree should be stable over time. As long as an application looks the same to a user, the logical tree 222 representing that application should remain the same, even if implementation details of the application behind the scenes have changed. Native elements that exist for structural and implementation reasons, such as a shell's "ShDocView" window in the Microsoft OS products should not appear in this tree, since the user does not perceive them.

The logical tree 222 is a single tree built from a plurality of fragments that is capable of unifying a plurality of different processes so that they are the same to the client. The logical tree 222 enables bulk retrieval and is capable of obtaining a value for a list of properties. By the time a user normally would have invoked a cross process call to ask for values, the accessibility system 200 will have fetched them through the use of the logical tree 222.

Figure 5:
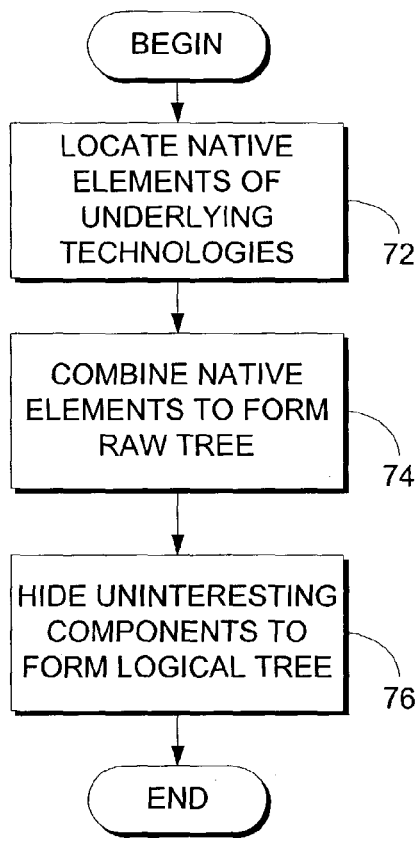
FIG. 5 is a flowchart showing a sequence of procedures for building a logical tree.

Instead of being constructed in one step as in the known systems, the logical tree 222 is constructed from fragments that are used to build a raw tree. As shown in FIG. 5, three main procedures build the logical tree 222. In procedure 72, the accessibility system 200 locates native elements of underlying technologies and arrives at the native trees shown in FIG. 4(A). In procedure 74, the accessibility system 200 combines native elements to form the raw tree 20 as shown in FIG. 4(B). Finally, in procedure 76, the logical tree 222 is obtained by hiding uninteresting components in the raw tree 20 as shown in FIG. 4(D).

FIG. 4(A) illustrates two native trees 10 and 14, which are constructed from native elements of underlying technologies such as the Win32 UI, or any other available UI. The native tree 10 includes a parent node 11 and a plurality of descendants 12 having various relationships with one another. Similarly, the native tree 14 includes a parent node 15 having a plurality of child nodes 16. The child nodes 16 may be described as siblings of one another.

As shown in FIG. 4(B), the native trees 10 and 14 may be combined to form a raw tree 20. The raw tree 20 includes a parent node 21, having two child nodes 22 and 30. The child node 22 has descendants 23-29 and the child node 30 has descendants 31-33. This raw tree 20 is a combination of the native trees 10 and 14, with the nodes of the native tree 10 forming nodes 22-29 and the nodes of the native tree 14 forming nodes 30-33.

Through a method broadly shown in FIGS. 4(C) and 4(D), the raw tree 20 is converted into the logical tree 222. To move from the raw tree 20 to the logical tree 222, a developer can insert hints in the raw tree. The developer can mark nodes within the raw tree 20 as "hide self" or "hide self and children" or as "hide children of node", etc. The developer can also move nodes sideways or place nodes before children. These "hints" and modifications in the raw tree 20 are used to form the logical tree 222. For example, in FIG. 4(C), a developer has marked nodes 24-26 and 33 of the raw tree 20 as uninteresting as indicated by blocks 40 and 41. Typically, nodes that contain elements that will not be visible to the user are marked as uninteresting. Nodes related to the visible UI are typically considered to be interesting and will be included in the logical tree 222 for use by the AT client 300. As shown in FIG. 4(D), the nodes marked as uninteresting are not included in the logical tree 222.

The accessibility system 200 uses the logical tree 222 to find information about events, the state of the system, the location of objects and information about controls. Known systems have not had the capability to scope within their trees. The logical tree 222 can be navigated based on the preferences of the client 300 and is capable of providing information regardless of the server side application in use.

The logical tree 222 is a single unifying tree that is a logical representation of the UI and is formed into a shape that includes only elements of interest to clients 300. Accordingly, instead of forcing AT products to filter the structural hierarchy of UI elements and guess at the model being presented to the end user, the logical tree 222 presents a hierarchy that closely maps to the structure being presented to the end user. This greatly simplifies the AT product's task of describing the UI to the user and helps the user interact with the application.

Figure 6:
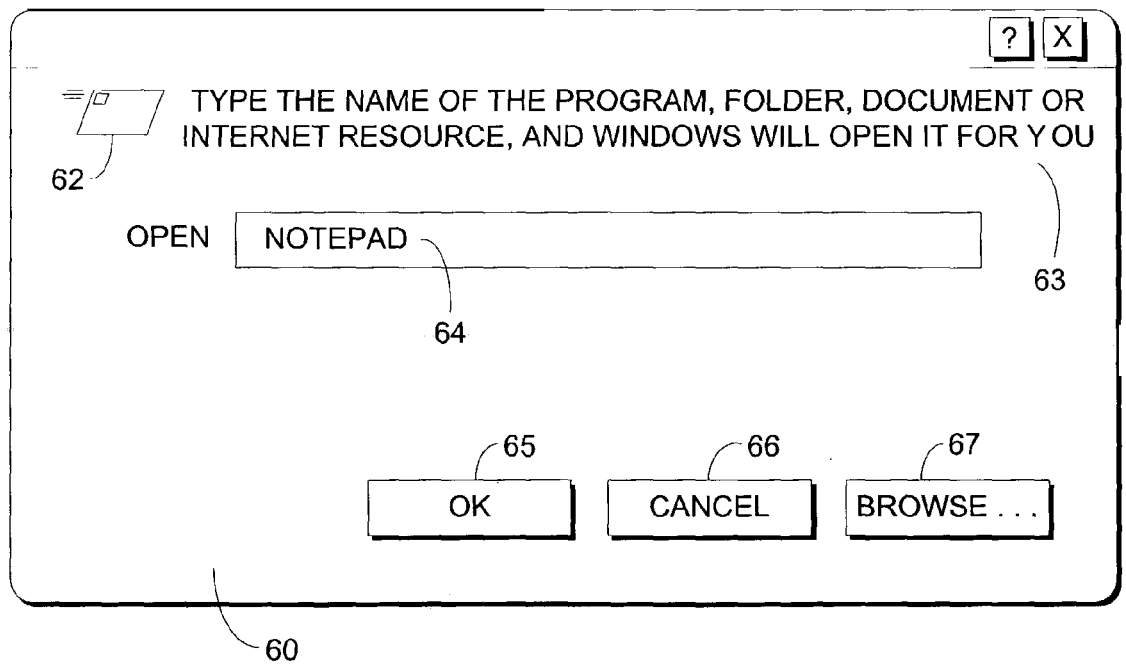
FIG. 6 shows a dialog box and its components forming logical elements.

Because this logical UI tree 222 is a fundamental part of the accessibility system 200, all of the other components of the accessibility system 200 are designed to work from the logical tree 222. For example, FIG. 6 shows a simple dialog box 60 that appears to have a very simple structure. However, when viewed through the currently available accessibility technology, the structure of this dialog box 60 is surprisingly complex. It contains 264 objects that an AT product must filter through to discover those that are meaningful to the end user. With the accessibility system 200 and its support for the logical UI Tree 222, the developer who owns this dialog box 60 can set a few properties to present the following structure shown in FIG. 6 to the AT products 300.

As shown in FIG. 6, for a "Run" dialog, the developer can indicate as interesting, the flying window graphic 62 and "Type the name of program, folder, document, or internet resource and windows will open it for you" at 63. The developer can also indicate as interesting the combo box 64 including notepad, word, calculator, etc., and the OK 65, cancel 66 and browse 67 buttons. This offers developers a low-cost mechanism to tag their element hierarchy and thereby produce a logical representation of their application's UI through the UI accessibility system 200. Each of the features shown may be represented by a node that has a specified relationship to each other node in the logical tree 222. This logical representation offers an immediate benefit to a testing team and to AT products or clients 300.

Although the logical tree 222 is of ultimate interest to the user, the raw element tree 20 also serves some important functions. While the logical tree 222 contains only elements that the user can relate to, the raw element tree 20 contains nodes, such as 22, that represent the implementation structure of the underlying framework. For a Win32 UI fragment, for example, this tree would contain nodes that represent HWNDs. In some respects, the raw element tree 20 is a 'half-way house' between the logical element tree 222 and the underlying frameworks' own native element trees. The raw element tree 20 is used as a basis for building the logical element tree 222, and it is where native elements first plug into the system.

The raw element tree 20 can also be used for debugging and testing. It is useful for pinpointing or describing where a particular problematic node is. Functionality on a base raw element node includes: methods for navigating the raw element tree; a method for jumping to a corresponding logical element (if one exists); property containing 'debug string' for this element—e.g. "HWND 0x483FE" for HWND nodes; and other 'behind the scenes infrastructure' methods. These other methods enable hit testing and location; events; and exposing properties that frameworks can easily provide (e.g. focused, enabled).

The raw element tree 20 contains nodes 22-33 that represent elements from various rendering engines. The raw element tree is used as a starting point for rendering engines to plug themselves into the accessibility system 200 and is built from lightweight adapter objects that adapt native elements, such as HWNDs from Win32, into a unified logical tree 222. It is additionally used for handling hosting transitions, where one technology hosts another. Since the raw element tree 20 is the base on which the logical tree 222 is built, it can be used to check that the logical tree 222 is complete and connected and can be used to check for unaccounted-for elements. The raw element tree 20 may further be used for other infrastructure-like tasks: such as providing some basic element ID and providing some basic framework-provided element properties, such as focused, enabled, and location.

The raw element tree 20 is not the primary source of information for AT products or clients 300, is not used for logical navigation and is not exposed to end-users. The raw element tree 20 also cannot be used to capture an element's position in tree so that it can be returned to at some future point in time. The logical element tree 222 performs all these functions.

The raw element tree 20 can typically be built mechanically from the raw elements of the underlying rendering technology (HWNDs, Elements) without knowledge of the logical elements represented. It can therefore be used to look for raw elements, which have not been accounted for in the logical tree 222. The raw element tree 20 is a useful debugging and diagnostic tool, as it allows a 'stack dump'-like description of a node's location to be captured. Furthermore, known systems base their trees on code specific criteria and are difficult to implement with diverse technologies. The present approach uses a general abstract 'raw element' type, which can be implemented by or on behalf of any underlying rendering technology.

In order to obtain the raw element tree, calling a raw element root will get a desktop element, verified by making sure that its parent is NULL and all other nodes have it as their ultimate ancestor. To obtain other elements, calling a method to obtain a raw element from a specified point will return the element using valid screen coordinates. After obtaining the raw element tree, it can be checked and verified by checking the elements (parents, siblings and children).

In operation, the client 300 can navigate the raw element tree 20 using relationships such as: parent; next sibling, previous sibling, first child, last child, etc. The client 300 can then jump from the raw element to the corresponding logical element in the logical tree 222.

Events Mechanism

When a client 300 wants to keep informed of events, the client 300 is able to register through the UI automation client 202 as shown in FIG. 3 to obtain the information. The client 300 specifies object information it wants to receive, where it wants the information to go, and the list of properties it wants to get back. The client request goes to UI automation client 202. UI automation client 202 can monitor any process on the desktop. The UI automation server 204 keeps track of which clients 300 are listening and knows how to get back to UI automation client 202. The UI automation client 202 advises the UI engine 206 of client interest, so the UI engine 206 knows when to tell the UI automation server 204 of the event. The UI engine does not have to utilize the client advice but may choose instead to always notify the UI automation server 204 of events or notify the UI automation server only if a client is listening for any events. The advice is useful if the UI engine wants to turn on UI automation server notification only if there is a client listening for events. The UI engine would do this to avoid possible degradation of speed of the UI and to avoid loading code modules it doesn't otherwise need.

The UI Engine 206 then informs the UI automation server 204 of a UI event. UI automation server 204 returns the requested logical element to the client 300 and sends information to the client 300 including properties of the event that the client 300 requested. The UI automation server 204 decides what information is within the scope of client request and only forms a logical element if the information is of interest. Forming a logical element includes pre-fetching, on the UI automation server side, the set of properties that the client has indicated it will use when handling the event. For example, the UI automation server 204 can discover a logical element for a combo box. The scope would be the combo box or its children. The client 300 can request children/parent/dependents to define scope during the registration phase.

After the UI automation server 204 determines whether information is within the requested scope, it builds a logical element. The UI automation client 202 serves the client 300 by talking to target applications receiving the requested information from the UI automation server 204 and routing objects to a proper space on the client 300.

The UI automation server 204 is created when the client 300 registers to receive event notification. As an example, a UI engine 206 is running the Microsoft Word word processing application. The client 300 has registered for name property change. The client's registration causes the UI automation server 204 to be created. The client's registration also advises the UI engine 206 to start notifying the UI automation server 204 for the name property. The UI engine 206 doesn't get scope information. The UI engine 206 calls one of the APIs for the server side. The UI engine 206 specifies (1) what property changed; (2) the new value of the property; and (3) perhaps the old value. The UI automation server 204 is created based on events of interest to the client 300 and therefore knows events, properties, clients, and scope of interest so it knows if any client 300 is interested in the created logical element. If more than one client 300 has registered for events with a particular UI automation server 204 and the clients 300 have registered for the same event and have asked for properties to be bulk fetched with the returned logical element, when the UI automation server 204 sends an event back to the clients 300, each client 300 will get the union of the requested bulk fetch properties returned with the logical element.

For each client 300 listening, the UI automation server 204 notifies the client 300 passing the client the logical element associated with the event. The UI automation server 204 creates only one logical element. This is an improvement over the current technology in which each client 300 would be required to ask for its own copy of the object that is the source of the event.

If the UI engine 206 does not utilize the UI automation client's advice when clients register for events, the UI engine 206 can ask the UI automation server 204 if there are any accessibility clients 300 listening and if no one is listening, then can avoid the work of creating the information and sending it to the UI automation server 206. For example, a screen reader is the client 300 and specifies where it wants information to go, the focus change object to receive events, and the specific list of properties of interest. The UI engine 206 is advised and knows it should send events to the UI automation server 204. Upon detecting focus changes, the UI engine 206 notifies the UI automation server 204. The UI automation server 204 converts to a well-known interface and sends the event and object to the UI automation client 202. The UI automation client 202 routes the object to an appropriate space on the client 300.

The above-described components improve upon the known systems by eliminating the central repository in the kernel for events. Instead, the UI automation server 204 knows all clients 300 interested in getting information about the context in which it is running. The elimination of the kernel repository also creates a more peer-to-peer interaction, since the UI automation server 204 fulfills the function previously performed in the kernel. The accessibility system 200 of the invention gives client 300 the ability to specify what it wants to see such that filtering is accomplished on the server side using the UI automation server 204.

Figure 7:
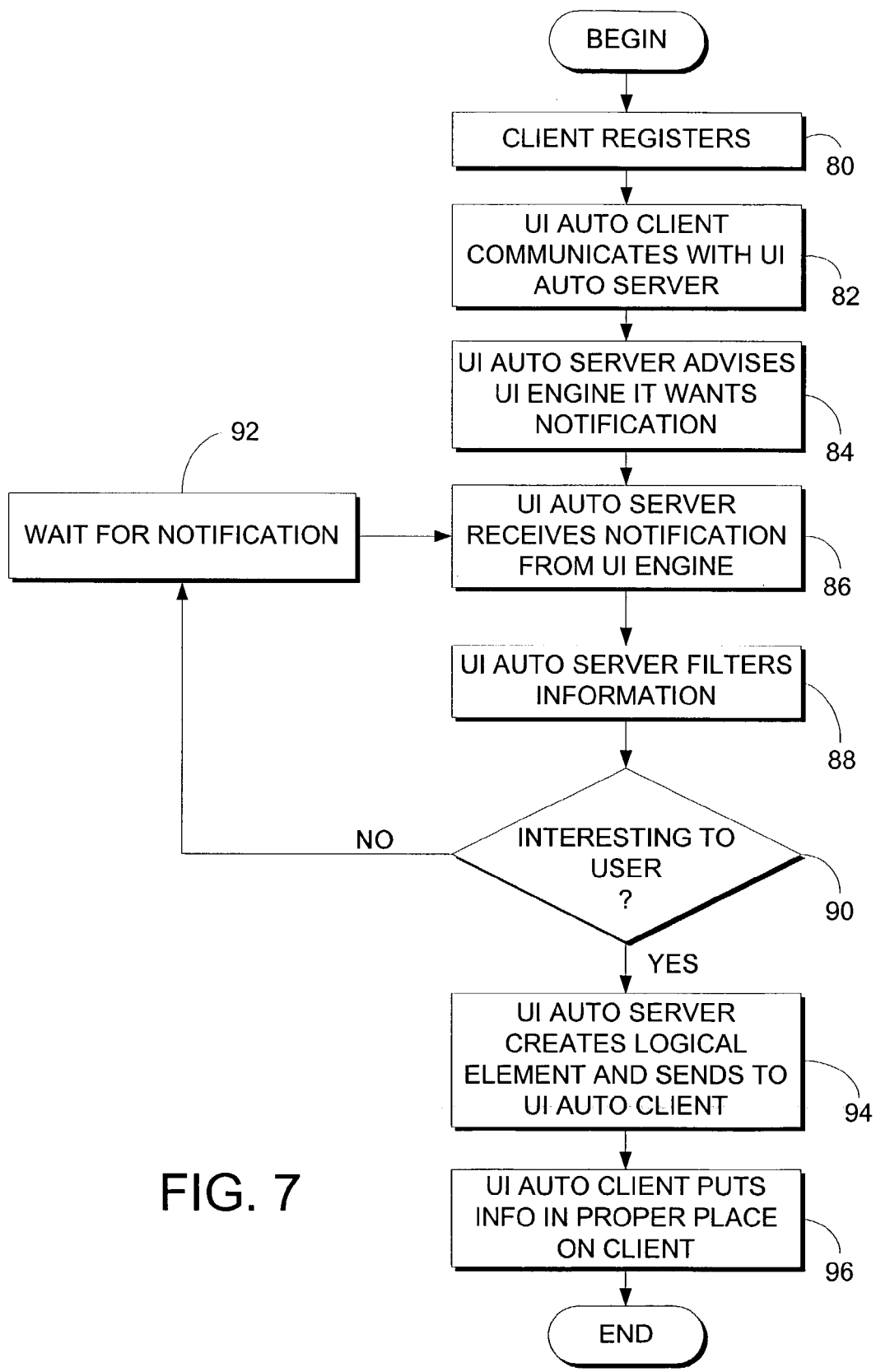
FIG. 7 is a flowchart illustrating procedures involved in activating an event mechanism of the invention.

FIG. 7 is a flow chart showing the procedures involved in the event registration and notification method. In step 80, the client 300 requests event notification. In step 82, the UI automation client 202 communicates the request to the UI automation server 204. In step 84, the UI automation client advises the UI engine 206 that it wants notification. In step 86, the UI automation server 204 receives notification from the UI engine 206. In step 88, the UI automation server 204 filters the received information. If the received information is found uninteresting to the user in step 90, the UI automation server 204 discards the information and continues to wait for notification in step 92. Alternatively, if the information is found to be interesting in step 90, the UI automation server 204 creates a logical element and sends it to the UI automation client 202 in step 94. In step 96, the UI automation client 202 puts the received information in its proper place on the client 300.

The event mechanism 210 of the accessibility system 200 allows the client 300 to register to receive event notifications for property changes in the UI, tree changes in a control's structure, multimedia events, and related information. Without these capabilities, clients 300 have to continually poll all the UI elements in the system to see if any information, structure, or state has changed. The accessibility system 200 events mechanism 210 also allows clients 300 to receive events out-of-process, request a collection of properties to be, returned with the event notification, and to register for events on multiple elements.

The event mechanism 210 exposes: the interfaces the AT product or test application uses to register for events; interfaces the AT product implements on objects used to receive event notifications; and the interfaces control implementers use to notify the event engine of UI events. The event mechanism 210 is used to allow AT products and test applications to receive events independently of the UI engines used to render UI and allows AT products and test applications to track top-level application windows and focus without regard to the underlying technology.

Where applicable, events are associated with logical elements from the application's logical element tree 222. Where logical elements are not applicable, events are associated with a human readable string or other well-known object that represents the source of an event. The event mechanism 210 provides filtering based on user-supplied preferences during event registration. By using the client's filtering preferences at the server, before creating the event-related data and sending it cross process to the client, the event mechanism 210 inherently improves out-of-process performance by reducing the number of cross process calls. The event mechanism 210 provides a way to specify the properties of a logical element that are interesting for the event during event registration. This further reduces the number of cross-process calls. The event mechanism 210 is extensible without requiring major operating system (OS) changes. Although the event mechanism 210 may be implemented using managed code, unmanaged applications can access it through COM interoperability.

The event mechanism 210 can keep the client informed of numerous types of events. One type of event is a top-level window event. Top-level window events include events related to menus and combo box dropdowns or any feature having the desktop as a parent. Another type of event is a focus event. Clients 300 often require a method for tracking focus. Additional types of events include property change events and logical structure change events. Property change events are fired when properties of logical elements change. Logical structure change events are fired when the logical element tree structure changes.

Events can also be fired from control patterns. The events fired from controls patterns need to be extensible and therefore these events are identified by a GUID. Any GUID value is accepted when registering. For any new control pattern, the events it documents need to be unique GUIDs. AT products may need to be modified to listen for new control pattern events. The listener also needs to be able to scope these events. For instance, directed testing may want to limit these events to a particular application or control within an application. The controls patterns define what the source is and event consumers will need to refer to that part of the documentation in order to know how to use a source element and event argument object.

Another type of event is the multimedia event. Multimedia may include sound, video, and animation. The methods will support multimedia events and notify a client of actions including "stopped", "paused", "fastforwarded", "rewound", and "muted". Simple sound events may be handled separately from multimedia events. Simple sound events represent simple, short-duration, sounds that exist to convey to the user some event other than the sound itself. Simple sound events may include: the sound played when new mail has arrived; the sound generated when the battery on a laptop is low; or the sound played when a message box is displayed with the IconExclamation type.

Another type of event is a soft focus event. Soft focus events appear on the desktop but stay in the background. Some examples of soft focus events are: a balloon help window indicating "New updates are available" in the notification area; a flashing icon in the task bar for a background application that wants to gain focus; and a printer icon appearing and disappearing from the notification tray when printing starts and ends. These events may seem to overlap somewhat with other event categories (multimedia may involve animation events as does soft focus). However, the event will be categorized based on what it conveys to the user rather than how it is conveyed.

The client side APIs 310 and the provider side APIs 440 provide methods for event notification supporting the types of events enumerated above. These methods will be further described below in connection with FIGS. 8-10.

Control Patterns

The accessibility model offers a unique approach to categorizing and exposing the functionality supported by a particular UI element or control. Instead of associating functionality with a specific control type, (for example, a button, an edit box, or a list box) as in the prior art, the accessibility model defines a set of common control patterns that each define one aspect of UI behavior. Because these patterns are independent of each other, they can be combined to describe the full set of functionality supported by a particular UI element.

For example, instead of describing an element in terms of its class name, such as Button, the accessibility system 200 describes it as supporting the invokable control pattern. A control pattern defines the structure, properties, events, and methods supported by an element. Therefore, these patterns not only allow the client to query a control's behavior, they also allow it to programmatically manipulate the control by using interfaces designed for a particular pattern. For example, a SelectionContainer pattern provides methods to query for the selected items, to select or deselect a specific item, or to determine if the control supports single or multiple selection modes.

The control patterns currently defined for the accessibility system 300 include: (1) Selection Container; (2) Hierarchy; (3) Invokable; (4) Simple Grid; (5) Text; (6) Value; (7) Represents Object; (8) Scrollable; (9) Sortable; (10) Drawing; and (11) Other Container.

This technique enables control developers to implement a new type of control while still having a well-defined approach for exposing its behavior to AT products and test scripts. If a new type of behavior is introduced, a new control pattern can be defined to express the required functionality.

Assistive technology products and test scripts can now be written to understand how to work with each pattern, instead of each UI control. Because there are far fewer control patterns than control classes, this technique minimizes necessary code. This approach also encourages a more flexible architecture that can effectively interrogate and manipulate new controls (as long as they support known control patterns).

The following table provides some examples of common controls and the patterns they will support.

TABLE 1

| Control | Relevant Control Patterns |
| --- | --- |
| Button | Invokable |
| Checkbox, Radiobutton | Value |
| Listbox | SelectionContainer, Scrollable |
| Combobox | SelectionContainer, Scrollable, Value |
| Treeview | SelectionContainer, Scrollable, Hierarchy |
| Listview | SelectionContainer, Scrollable, Sortable |
| Textbox, Edit | Value, Text, Scrollable |

More specific interfaces will be used to expose functionality associated with common control patterns. Examples of these patterns include: (1) selection managing containers; (2) grid layout containers; (3) UI elements that contain values; (4) Icons that represent objects (files, emails, etc); and (5) UI elements that may be invoked. In general, these patterns are not tightly bound to specific controls and different controls may implement the same patterns. For example, listboxes, combo boxes, and treeviews all implement the 'selection managing container' pattern. Some controls may implement multiple patterns if appropriate: a selection grid would implement both the 'Grid layout container' pattern and the 'Selection managing container' pattern.

There is no single 'role' property as in previous applications. Instead, two separate mechanisms are used. Control patterns determine the available functionality of a control and a human-readable localizable property provides a control-type name that the user can understand, such as 'button', 'list box', etc.

System APIs

Figure 8:
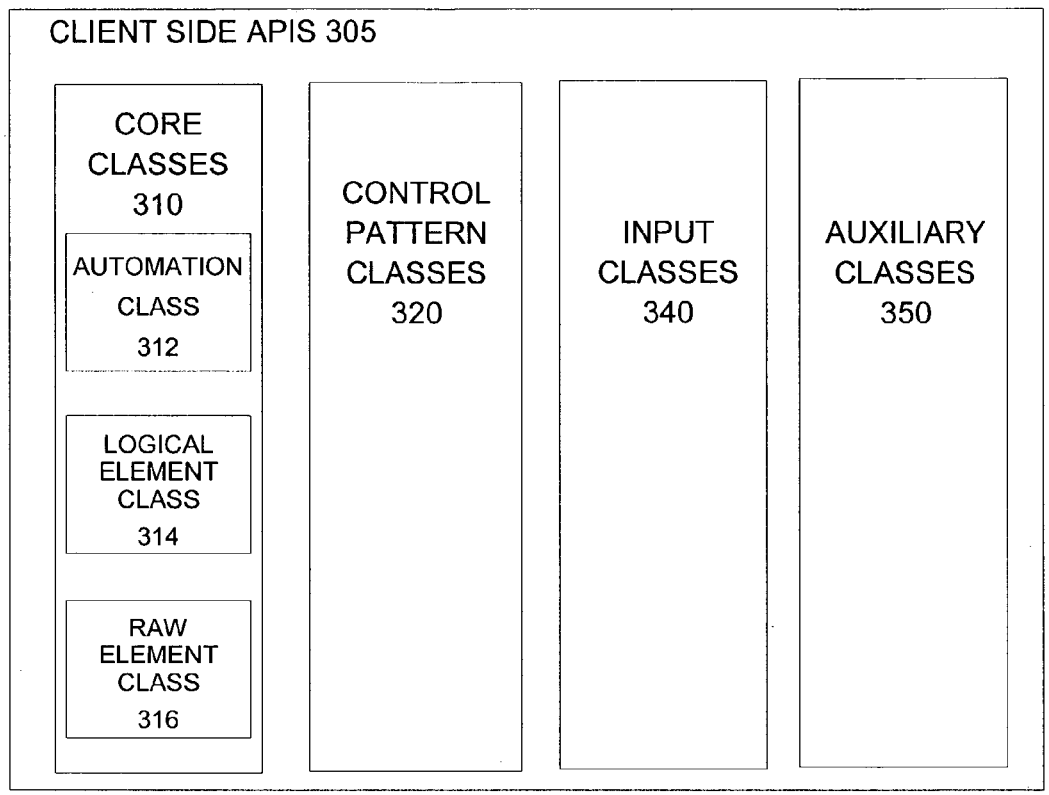
FIG. 8 is a block diagram illustrating client side APIs in an embodiment of the invention.

FIG. 8 illustrates details of the client side APIs 305 in an embodiment of the invention. The client side APIs 305 may include a set of core classes 310. The core classes 310 may include one or more automation class 312, a logical element class 314, and a raw element class 316. The client side APIs 305 may additionally include one or more control pattern class 320, input class 340, and auxiliary class 350. Each of these types of classes is further described below.

Client automation class 312 provides UI automation methods for clients 300. The client automation class 312 contains methods that are not specific to any UI element. The client automation class 312 may provide a method for obtaining a logical or raw element from a point, a window handle, or the desktop root element. The client automation class 312 additionally may provide methods for finding a logical element based input criteria. The client automation class 312 preferably also includes a method for registering and un-registering for event notifications. The automation class 312 preferably also provides helper functions for loading proxy DLLs, retrieving the localized names of properties and control patterns and performing element comparisons. The client automation class 312 also includes methods for clients 300 to listen for events. Some methods provided by the automation classes 312 are summarized in the table below.

TABLE 2

| Name | Signature |
| --- | --- |
| AddAutomationEventHandler | Void AddAutomationEventHandler (AutomationEvent eventId, LogicalElement element, ScopeFlags scope, AutomationEventHandler eventHandler) |
| AddAutomationPropertyChangedEventHandler | VoidAddAutomationPropertyChangedEventHandler ( LogicalElement element, ScopeFlags scope, AutomationPropertyChangedEventHandler eventHandler, AutomationProperty[ ] properties ) |

TABLE 2-continued

| Name | Signature |
| --- | --- |
| AddFocusChangedEventHandler | Void AddFocusChangedEventHandler( FocusChangedEventHandler eventHandler ) |
| AddLogicalStructureChangedEventHandler | Void AddLogicalStructureChangedEventHandler ( LogicalElement element, ScopeFlags scope, LogicalStructureChangedEventHandler eventHandler ) |
| AddTopLevelWindowEventHandler | Void AddTopLevelWindowEventHandler( TopLevelWindowEventHandler eventHandler ) |
| Compare | Boolean Compare( RawElement el1, RawElement el2 ) |
| Compare | Boolean Compare( Int32[ ] a1, Int32[ ] a2 ) |
| Compare | Boolean Compare( LogicalElement el1, LogicalElement el2 ) |
| FindLogicalElement | LogicalElement FindLogicalElement( LogicalElement root, LogicalElement start, Boolean includeStart, MatchCondition[ ] cond ) |
| FindLogicalElement | LogicalElement FindLogicalElement( LogicalElement root, LogicalElement start, Boolean includeStart, MatchCondition[ ] cond, Int32 maxDepth ) |
| FindRawElement | RawElement FindRawElement( RawElement root, RawElement start, Boolean includeStart, MatchCondition[ ] cond ) |
| FindRawElement | RawElement FindRawElement( RawElement root, RawElement start, Boolean includeStart, MatchCondition[ ] cond, Int32 maxDepth ) |
| PatternName | String PatternName( AutomationPattern pattern ) |
| PropertyName | String PropertyName( AutomationProperty property ) |
| RemoveAllEventHandlers | Void RemoveAllEventHandlers( ) |
| RemoveAutomationEventHandler | Void RemoveAutomationEventHandler ( AutomationEvent eventId, LogicalElement element, AutomationEventHandler eventHandler ) |
| RemoveAutomationPropertyChangedEventHandler | VoidRemoveAutomationPropertyChangedEventHandler ( LogicalElement element, AutomationPropertyChangedEventHandler eventHandler ) |
| RemoveFocusChangedEventHandler | Void RemoveFocusChangedEventHandler( FocusChangedEventHandler eventHandler ) |
| RemoveLogicalStructureChangedEventHandler | Void RemoveLogicalStructureChangedEventHandler ( LogicalElement element, LogicalStructureChangedEventHandler eventHandler ) |
| RemoveTopLevelWindowEventHandler | Void RemoveTopLevelWindowEventHandler( TopLevelWindowEventHandler eventHandler |
| EnableDefaultProxiesTemporaryMethod | Void EnableDefaultProxiesTemporaryMethod( ) |
| GetProxyDescriptionTable | ProxyDescription [ ] GetProxyDescriptionTable( ) |
| InternalOnlyTemporaryApiEnableSecurity | Void InternalOnlyTemporaryApiEnableSecurity( ) |
| RegisterProxyAssembly | Void RegisterProxyAssembly( AssemblyName assemblyName ) |
| SetProxyDescriptionTable | Void SetProxyDescriptionTable( ProxyDescription[ ] proxyDescription ) |
| RegisterProxyDescriptions | Void RegisterProxyDescriptions( ProxyDescription[ ] proxyDescription ) |

In operation, if a client 300 needs to obtain information for a user about an application, the client 300 looks for a button to press and observes text on the button. The client 300 might call a method such as a method for finding a logical element (FindLogicalElement) as shown above in Table 2. The client side APIs 305 will return a value that is referenced to a position in the logical tree 222 of the client side interface 220.

Through the logical tree 222, the accessibility system 200 gives the client 300 an abstract view of the UI regardless of the application in use. The abstract model includes structures, properties, events, and functionality that a list box, button or other UI component can expect to have in common with one another.

The client side APIs 305 may additionally include the logical element class 314. The logical element class 314 may provide fields, methods and properties for obtaining common properties of elements. As set forth above, a logical element represents a UI element in the logical tree 222 such as bounding rectangle, focus, enabled, clickable point, runtime and persistent identifiers, and name. The logical element classes 314 may also provide tools for navigating among elements such as first child, last child, next sibling, and parent. The logical element classes 314 may also provide tools for obtaining a specific pattern for an element or obtaining all patterns that are supported by the element. The logical element class 314 contains the fields, properties, and methods used for an element in the logical element tree 222.

TABLE 3

```
class System.Windows.Automation.LogicalElement
    Fields:
        read-only AutomationProperty AcceleratorKeyProperty
        read-only AutomationProperty AccessKeyProperty
        read-only AutomationEvent AutomationPropertyChangedEvent
        read-only AutomationProperty BoundingRectangleProperty
        read-only AutomationProperty ClassNameProperty
        read-only AutomationProperty ControlTypeProperty
        read-only AutomationProperty EnabledProperty
        read-only AutomationProperty FirstChildProperty
        read-only AutomationEvent FocusChangedEvent
        read-only AutomationProperty FocusedProperty
        read-only AutomationProperty KeyboardHelpTextProperty
        read-only AutomationProperty LastChildProperty
        read-only AutomationEvent LogicalStructureChangedEvent
        read-only AutomationProperty NameProperty
        read-only AutomationProperty NextSiblingProperty
        read-only Object NotSupported
        read-only AutomationProperty ParentProperty
        read-only AutomationProperty PersistentIDProperty
        read-only AutomationProperty PreviousSiblingProperty
        read-only AutomationProperty ProcessIDProperty
        read-only AutomationProperty RawTextProperty
        read-only AutomationProperty RuntimeIDProperty
        read-only AutomationProperty ShortHelpTextProperty
        read-only AutomationEvent TopLevelWindowEvent
        read-only AutomationEvent TreeLoadEvent
        read-only Object UseDefault
    Properties:
        Rect BoundingRectangle
        String DebugString
        LogicalElement FirstChild
        LogicalElement FocusedElement
        LogicalElement LastChild
        LogicalElement NextSibling
        LogicalElement Parent
        LogicalElement PreviousSibling
        RawElement RawElement
        LogicalElement RootElement
    Methods:
        Void Finalize( )
        LogicalElement FromHandle( IntPtr hwnd )
        LogicalElement FromPoint( Point pt )
        Point GetClickablePoint( )
        Object GetPattern( AutomationPattern pattern )
        Object GetPropertyValue( AutomationProperty idProp )
        Int32[ ] GetRuntimeID( )
        AutomationPattern[ ] GetSupportedPatterns( )
        AutomationProperty[ ] GetSupportedProperties( )
        Boolean SetFocus( )
        String ToString( )
        Boolean TryGetClickablePoint( Point& pt )
```

The client side APIs 305 additionally may include the raw element class 316. The raw element class 316 provides similar techniques for traversing the raw element tree. The raw element class 316 contains the fields, properties and methods used to access an element in the raw element tree.

TABLE 4

```
class System.Windows.Automation.RawElement
    Fields:
        read-only AutomationProperty BaseIsHostedProperty
        read-only AutomationProperty LogicalMappingProperty
        read-only AutomationProperty NativeWindowHandle
        read-only AutomationProperty RawFirstChildProperty
        read-only AutomationProperty RawLastChildProperty
        read-only AutomationProperty RawNextSiblingProperty
        read-only AutomationProperty RawParentProperty
        read-only AutomationProperty RawPreviousSiblingProperty
    Properties:
        Rect BoundingRectangle
        String DebugString
        RawElement FirstChild
        RawElement FocusedElement
        RawElement LastChild
        LogicalElement LogicalElement
        RawElement NextSibling
        RawElement Parent
        RawElement PreviousSibling
        RawElement RootElement
    Methods:
        RawElement FromHandle( IntPtr hwnd )
        RawElement FromPoint( Point pt )
        Void GetNativeProperties(
                    GetNativePropertiesOptions options,
                    String[ ]& names,
                    Object[ ]& values,
                    String[ ]& valueStrings )
        Object GetNativePropertyValue( String name )
        String GetNativePropertyValueAsString( String name )
        Object GetPropertyValue( AutomationProperty idProp )
        Int32[ ] GetRuntimeID( )
        AutomationProperty[ ] GetSupportedProperties ( )
        String ToString( )
```

The client side APIs 305 additionally include the input class 340. Input class 340 can be used to simulate mouse, keyboard and other types of input. The input class 340 allows programmatic input via input methods such as keyboard, pen and mouse. An exemplary input class is shown in the table below.

TABLE 5

```
sealed class System.Windows.Automation.Input
    Properties:
        Int32 XButton1
        Int32 XButton2
    Methods:
        Void MoveTo( Point pt )
        Void MoveTo( LogicalElement el )
        Void MoveToAndClick( LogicalElement el )
        Void MoveToAndClick( Point pt )
        Void SendKeyboardInput(
                    Byte vk,
                    Boolean press )
        Void SendMouseInput(
                    Int32 x,
                    Int32 y,
                    Int32 data,
                    SendMouseInputFlags flags )
System.Windows.Automation.PointSystem.Windows.Automation.Point
    Properties:
        Int32 x
        Int32 y
    Methods:
        String ToString( )
class System.Windows.Automation.NoClickablePointException
    Methods:
        Void GetObjectData(
                    SerializationInfo info,
                    StreamingContext context )
enum System.Windows.Automation.SendMouseInputFlags
    SendMouseInputFlags Absolute
    SendMouseInputFlags LeftDown
```

TABLE 5-continued

```
SendMouseInputFlags LeftUp
SendMouseInputFlags MiddleDown
SendMouseInputFlags MiddleUp
SendMouseInputFlags Move
SendMouseInputFlags RightDown
SendMouseInputFlags RightUp
SendMouseInputFlags Wheel
SendMouseInputFlags XDown
SendMouseInputFlags XUp
```

The client side APIs 305 additionally include the UI automation control pattern classes 320. UI automation control pattern classes 320 may expose the fields, properties and methods for programmatic access to specific functionality exposed by a logical element. The UI automation control patterns classes 320 help a user to interact with the control patterns defined in the UI accessibility system 200. For example, an application window pattern method exposes functionality to programmatically work with an application. The functionality may allow arrangement of child windows or location of the logical elements that represent tool bars, menus, scroll bars, and system menu within the application.

The control pattern classes 320 may include an application window pattern (ApplicationWindowPattern) class. The ApplicationWindowPattern class exposes behavior and information typically associated with a top-level application window. Clients 300 can use this class to tile or cascade the application's multiple document interface (MDI) children, find its button on the taskbar, and locate well-known sections of its user interface such as toolbars and menus. The following table illustrates an ApplicationWindow Pattern class of an embodiment of the invention.

TABLE 6

```
class System.Windows.Automation.ApplicationWindowPattern
    Fields:
        read-only AutomationProperty CanArrangeChildWindowsProperty
        read-only AutomationProperty MdiChildrenProperty
        read-only AutomationProperty MenuBarsProperty
        read-only AutomationPattern Pattern
        read-only AutomationProperty RelatedTaskBarButtonProperty
        read-only AutomationProperty ScrollBarsProperty
        read-only AutomationProperty StatusBarsProperty
        read-only AutomationProperty StatusIndicatorProperty
        read-only AutomationProperty SystemMenuProperty
        read-only AutomationProperty ToolBarsProperty
    Properties:
        Boolean CanArrangeChildWindows
        LogicalElement RelatedTaskBarButton
        LogicalElement StatustIndicator
        LogicalElement SystemMenu
    Methods:
        Boolean ArrangeChildWindows( ChildArrangement position )
        LogicalElement[ ] GetMdiChildren( )
        LogicalElement[ ] GetMenuBars( )
        LogicalElement[ ] GetScrollBars( )
        LogicalElement[ ] GetStatusBars( )
        LogicalElement[ ] GetToolBars( )
```

The control pattern classes 320 may also include a class for expanding and collapsing elements that provide a mechanism to show and hide their content (ExpandCollapsePattern). The ExpandCollapsePattern class functions as a wrapper class for an ExpandCollapse pattern. The ExpandCollapsePattern class contains the fields, properties and methods used by the client 300 to manipulate content that can be expanded (displayed) or collapsed (hidden). The following table illustrates an embodiment of the ExpandCollapsePattern class.

TABLE 7

```
class System.Windows.Automation.ApplicationWindowPattern
    Fields:
        read-only AutomationProperty CanArrangeChildWindowsProperty
        read-only AutomationProperty MdiChildrenProperty
        read-only AutomationProperty MenuBarsProperty
        read-only AutomationPattern Pattern
        read-only AutomationProperty RelatedTaskBarButtonProperty
        read-only AutomationProperty ScrollBarsProperty
        read-only AutomationProperty StatusBarsProperty
        read-only AutomationProperty StatusIndicatorProperty
        read-only AutomationProperty SystemMenuProperty
        read-only AutomationProperty ToolBarsProperty
    Properties:
        Boolean CanArrangeChildWindows
        LogicalElement RelatedTaskBarButton
        LogicalElement StatusIndicator
        LogicalElement SystemMenu
    Methods:
        Boolean ArrangeChildWindows( ChildArrangement position )
        LogicalElement[ ] GetMdiChildren( )
        LogicalElement[ ] GetMenuBars( )
        LogicalElement[ ] GetScrollBars( )
        LogicalElement[ ] GetStatusBars( )
        LogicalElement[ ] GetToolBars( )
```

The control pattern classes 320 may also include a grid item pattern (GridItemPattern) class that allows clients 300 to quickly determine if a discovered item is part of a grid. If the item is part of a grid, the GridItemPattern class helps to determine where the item is in the grid in terms of row/column coordinates and spans. The GridItemPattern class preferably contains the fields, properties and methods used by the client 300 to manipulate a control that exposes the functionality of the cell in a grid. The following table illustrates a GridItemPattern class in accordance with an embodiment of the invention.

TABLE 8

```
class System.Windows.Automation.GridItemPattern
    Fields:
        read-only AutomationProperty ColumnProperty
        read-only AutomationProperty ColumnSpanProperty
        read-only AutomationProperty ContainingGridProperty
        read-only AutomationPattern Pattern
        read-only AutomationProperty RowProperty
        read-only AutomationProperty RowSpanProperty
    Properties:
        Int32 Column
        Int32 ColumnSpan
        LogicalElement ContainingGrid
        Int32 Row
        Int32 RowSpan
```

The control pattern classes 320 may also include a hierarchy item pattern (HierarchyItemPattern) class that represents elements that have a hierarchical relationship to one another such as the elements in a TreeView control. The HierarchyItemPattern class contains the fields, properties and methods used by an automation client 300 to manipulate a control that exposes the hierarchical relationship between UI elements independent of their relationship in the logical tree 222. The following table illustrates a HierarchyItemPattern class in accordance with an embodiment of the invention.

TABLE 9

```
class System.Windows.Automation.HierarchyItemPattern
    Fields:
        read-only AutomationProperty DepthProperty
        read-only AutomationProperty FirstChildProperty
```

TABLE 9-continued

```
read-only AutomationEvent HierarchyChangedEvent
read-only AutomationProperty LastChildProperty
read-only AutomationProperty NextSiblingProperty
read-only AutomationProperty ParentProperty
read-only AutomationPattern Pattern
read-only AutomationProperty PreviousSiblingProperty
Properties:
Int32 Depth
LogicalElement FirstChild
LogicalElement LastChild
LogicalElement NextSibling
LogicalElement Parent
LogicalElement PreviousSibling
```

The control pattern classes 320 may also include an invoke pattern (InvokePattern) class that represents objects that have a single, unambiguous, action associated with them. Examples of pertinent UI components include: push buttons; hyperlinks; menu items; radio buttons, and check boxes. The InvokePattern class contains the fields, properties and methods used by an automation client 300 to manipulate an element that, when invoked, causes a single, unambiguous action to occur. The following table illustrates an exemplary InvokePattern class in accordance with an embodiment of the invention.

TABLE 10

```
class System.Windows.Automation.InvokePattern
    Fields:
        read-only AutomationEvent InvokedEvent
        read-only AutomationPattern Pattern
    Methods:
        Void Invoke( )
```

The control pattern classes 320 may also include a multiple view pattern (MultipleViewPattern) class that serves as a wrapper class for a multiple view pattern element. The multiple view pattern element is an element that can switch between multiple representations of one information set. The MultipleViewPattern class contains the fields, properties and methods used by an automation client 300 to manipulate an element that has the functionality to switch between multiple representations of the same set of information. The following table illustrates a MultipleViewPattern class in accordance with an embodiment of the invention.

TABLE 11

```
class System.Windows.Automation.MultipleViewPattern
    Fields:
        read-only AutomationProperty CurrentViewProperty
        read-only AutomationPattern Pattern
        read-only AutomationProperty SupportedViewsProperty
    Properties:
        Int32 CurrentView
    Methods:
        Int32[ ] GetSupportedViews( )
        String GetViewName( Int32 viewID )
        Boolean SetView( Int32 viewID )
```

The control pattern classes 320 may additionally include a range value pattern (RangeValuePattern) class that exposes a related set of properties that reflect a control's ability to manage a value within a finite range. The RangeValuePattern class conveys a control's valid minimum and maximum values and its current value. The RangeValuePattern class contains the fields, properties and methods used by an automation client 300 to get a current value and value range for an element. The following table illustrates a RangeValuePattern class in accordance with an embodiment of the invention.

TABLE 12

```
class System.Windows.Automation.RangeValuePattern
    Fields:
        read-only AutomationProperty MaximumProperty
        read-only AutomationProperty MinimumProperty
        read-only AutomationPattern Pattern
    Properties:
        Object Maximum
        Object Minimum
```

The control pattern classes 320 may also include a scroll pattern (ScrollPattern) class that represents UI elements that can change their viewable region. The ScrollPattern class contains the fields, properties and methods used by the automation client 300 to manipulate an element that has the ability to change the portion of its visible region by scrolling. The following table illustrates a ScrollPattern class in accordance with an embodiment of the invention.

TABLE 13

```
class System.Windows.Automation.ScrollPattern
    Fields:
        read-only AutomationProperty HorizontallyScrollableProperty
        read-only AutomationProperty HorizontalScrollPercentProperty
        read-only AutomationProperty HorizontalViewSizeProperty
        read-only AutomationPattern Pattern
        read-only AutomationProperty VerticallyScrollableProperty
        read-only AutomationProperty VerticalScrollPercentProperty
        read-only AutomationProperty VerticalViewSizeProperty
    Properties:
    Boolean HorizontallyScrollable
    Single HorizontalScrollPercent
    Single HorizontalViewSize
    Boolean VerticallyScrollable
    Single VerticalScrollPercent
    Single VerticalViewSize
    Int32 NoScroll
    Methods:
    Boolean Scroll(
        ScrollAmount horizontalAmount,
        ScrollAmount verticalAmount )
    Void ScrollHorizontal( ScrollAmount amount )
    Boolean ScrollIntoView(
        LogicalElement le,
        Boolean alignToTop )
    Void ScrollVertical( ScrollAmount amount )
    Void set_HorizontalScrollPercent( Single value )
    Void set_VerticalScrollPercent( Single value )
    Boolean SetScrollPercent(
        Single horizontalPercent,
        Single verticalPercent )
```

The control pattern classes 320 may also include a selection pattern (SelectionPattern) class that represents containers that manage selection. A related selection item pattern (SelectionItemPattern) class contains the fields, properties and methods used by the client 300 to manipulate an element that can be selected and unselected. The following tables illustrate an exemplary SelectionPattern class and SelectionItemPattern class in accordance with an embodiment of the invention.

TABLE 14

```
class System.Windows.Automation.SelectionItemPattern
    Fields:
        read-only AutomationProperty IsSelectedProperty
        read-only AutomationPattern Pattern
    Properties:
```

TABLE 14-continued

```
        Boolean IsSelected
        Methods:
        Boolean AddToSelection( )
        Boolean RemoveFromSelection( )
        Boolean Select( )
```

TABLE 15

```
class System.Windows.Automation.SelectionPattern
    Fields:
    read-only AutomationProperty AtLeastOneSelectionRequiredProperty
    read-only AutomationEvent ElementAddedToSelectionEvent
    read-only AutomationEvent ElementRemovedFromSelectionEvent
    read-only AutomationEvent ElementSelectedEvent
    read-only AutomationEvent InvalidatedEvent
    read-only AutomationPattern Pattern
    read-only AutomationPattern SelectionByIDPattern
    read-only AutomationProperty SelectionProperty
    read-only AutomationProperty SupportsMultipleSelectionProperty
    Properties:
    Boolean AtLeastOneSelectionRequired
    IEnumerable Selection
    Boolean SupportsMultipleSelection
    Methods:
    Boolean AddElementToSelection( LogicalElement el )
    Boolean IsSelectable( LogicalElement el )
    Boolean IsSelected( LogicalElement el )
    Boolean RemoveElementFromSelection( LogicalElement el )
    Boolean SelectElement( LogicalElement el )
```

The control pattern classes 320 may also include a sort pattern (SortPattern) class. The SortPattern class contains the fields, properties and methods used by an automation client to manipulate a container element that can sort its sub-elements. The following table illustrates a SortPattern class in accordance with an embodiment of the invention.

TABLE 16

```
class System.Windows.Automation.SortPattern
    Fields:
    read-only AutomationProperty DepthProperty
    read-only AutomationProperty KeysProperty
    read-only AutomationProperty MaintainsSortOrderProperty
    read-only AutomationProperty OrderProperty
    read-only AutomationPattern Pattern
    Properties:
    Int32 Depth
    Boolean MaintainsSortOrder
    Methods:
    String GetKeyName( Int32 key )
    Int32[ ] GetKeys( )
    SortInformation[ ] GetOrder( )
    Boolean Sort( SortInformation[ ] newOrder )
```

The control pattern classes 320 may also include a value pattern (ValuePattern) class for representing UI elements that express a value. The ValuePattern class contains the fields, properties and methods that can be used by a client 300 to manipulate an element that has a value associated with it. The following table illustrates a ValuePattern class in accordance with an embodiment of the invention.

TABLE 17

```
class System.Windows.Automation.ValuePattern
    Fields:
    read-only AutomationProperty IsReadOnlyProperty
    read-only AutomationPattern Pattern
    read-only AutomationProperty ValueAsObjectProperty
    read-only AutomationProperty ValueAsStringProperty
```

TABLE 17-continued

```
        Properties:
        Boolean IsReadOnly
        Object ValueAsObject
        String ValueAsString
        Methods:
        Boolean SetValue( Object val )
```

The control pattern classes 320 may further include a visual information pattern (VisualInformationPattern) class that can be used to express information about an image or an animation that is conveying information to the user. The VisualInformationPattern class contains the fields, properties and methods used by the automation client 300 to manipulate an element that has an image or animation that is conveying information to the user. The following table illustrates a VisualInformationPattern class in accordance with an embodiment of the invention.

TABLE 18

```
class System.Windows.Automation.VisualInformationPattern
    Fields:
    read-only AutomationProperty InformationProperty
    read-only AutomationPattern Pattern
    Properties:
    Int32 Information
```

The control pattern classes 320 may additionally include a window pattern (WindowPattern) class that functions as a wrapper class for a window pattern. The WindowPattern class contains the fields, properties and methods used by the automation client 300 to manipulate a window on the user's desktop. The following table illustrates a WindowPattern class in accordance with an embodiment of the invention.

TABLE 19

```
class System.Windows.Automation.WindowPattern
    Fields:
    read-only AutomationProperty InteractionStateProperty
    read-only AutomationProperty MaximizableProperty
    read-only AutomationProperty MinimizableProperty
    read-only AutomationProperty ModalProperty
    read-only AutomationProperty MoveableProperty
    read-only AutomationPattern Pattern
    read-only AutomationProperty ResizableProperty
    read-only AutomationProperty TopMostProperty
    read-only AutomationProperty VisualStateProperty
    read-only AutomationEvent WindowOpenedEvent
    Properties:
    WindowInteractionState InteractionState
    Boolean Maximizable
    Boolean Minimizable
    Boolean Modal
    Boolean Moveable
    Boolean Resizable
    Boolean TopMost
    WindowVisualState VisualState
    Methods:
    Void Close( )
    Boolean MoveTo(
        Int32 x,
        Int32 y )
    Boolean Resize(
        Int32 width,
        Int32 height )
    Boolean SetVisualState( WindowVisualState state )
```

The client-side APIs 300 also may include auxiliary classes 350. The auxiliary classes may include a plurality of classes that represent property, event, and pattern identifiers as well as helper classes for using events mechanism and input features.

The auxiliary classes 350 may include an automation identifier (AutomationIdentifier) class. The AutomationIdentifier class is a base class for object identity-based identifiers. This class is effectively abstract since only derived classes are instantiated. The auxiliary classes 350 may additionally include an automation event (AutomationEvent) class that represents a type used to identify events in the accessibility system 200. The auxiliary classes 350 may also include an automation pattern (AutomationPattern) class that represents a type used to identify control patterns in accessibility system 200. The auxiliary classes 350 may additionally include an automation property (AutomationProperty) class that represents a type used to identify properties in the accessibility system 200.

The auxiliary classes 350 may further include an automation events argument (AutomationEventArgs) class that represents control pattern or custom event arguments used with events. Clients 300 receive an instance of this class with custom events. AutomationEventArgs is used to deliver information about an automation event to the client 300.

The auxiliary classes 350 may also include an automation property changed event arguments (AutomationPropertyChangedEventArgs) class used with UI events. Clients 300 receive an instance of this class with property changed events. AutomationPropertyChangedEventArgs is used for delivering information about a property changed event to the client 300.

The auxiliary classes 350 may further include a logical structure changed event arguments class. The LogicalStructureChangedEventArgs class may be used with UI events to provide clients 300 with an instance of this class along with logical tree change events. LogicalStructureChangedEventArgs is used to deliver information about a logical structure change to client 300.

The auxiliary classes 350 may additionally include a top level window event arguments (TopLevelWindowEventArgs) class that may be used with UI events to provide clients 300 with an instance of this class with custom events. TopLevelWindowEventArgs is used to deliver information about a top level window event to the client 300. A top-level window is a window whose parent is the desktop. The use of the term "opened" indicates that a new top-level window has appeared to the user. The use of the term "closed" indicates that a top-level window has been destroyed.

The auxiliary classes 350 may further include a tree load events arguments (TreeLoadEventArgs) class. The TreeLoadEventsArgs class is a custom event arguments class used with UI events. Clients 300 may receive an instance of this class with along with a tree load event. TreeLoadEventArgs may be used to deliver information about a tree loading event to the client 300.

The auxiliary classes 350 may additionally include a VKeys class that provides constants for input related methods. The auxiliary classes 350 may also include a NoClickablePointException. The exception is thrown when an error occurs within a logical element at a clickable point. An error may occur when a bounding rectangle is empty, has no width or height or a logical element at that point has changed.

The auxiliary classes 350 may also include implement several classes to receive event notifications. A focus changed event arguments (FocusChangedEventArgs) class is used to deliver information about a focus change event to a client.

Figure 9:
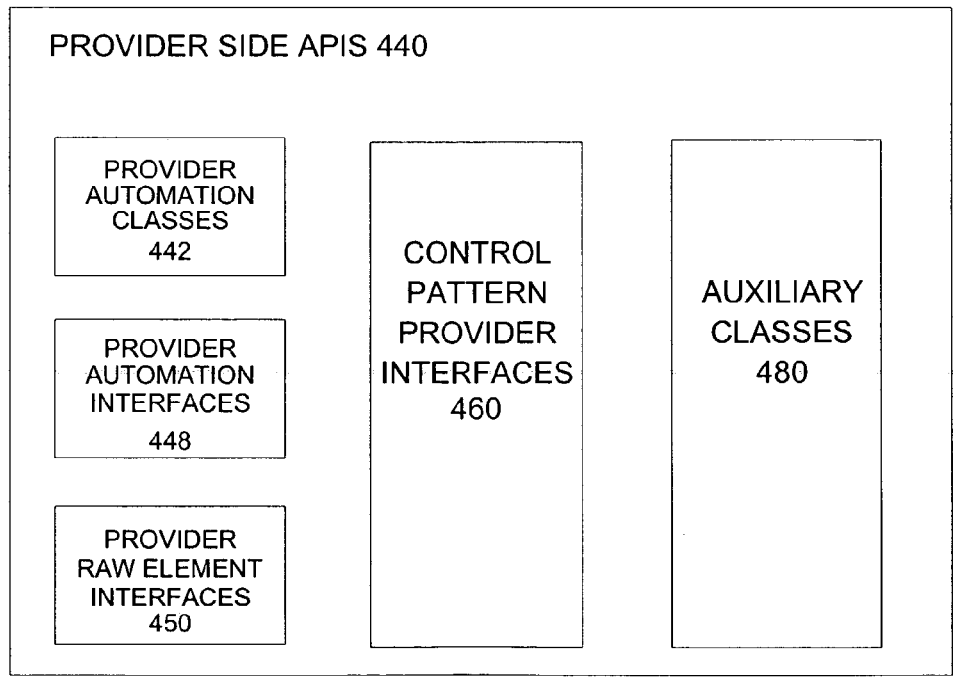
FIG. 9 is a block diagram illustrating server side APIs in an embodiment of the invention.

As shown in FIG. 9, the provider side APIs 440 include provider automation classes 442, provider automation interfaces 448 and provider raw element interfaces 450. The provider side APIs 440 also may include control pattern provider interfaces 460 and auxiliary classes 480. The auxiliary classes may share 480 and 350 may share types for using and communicating information such as property identifiers, event identifiers, pattern identifiers and basic types such as a class representing a rectangle or a point. Other features may be unique to the provider auxiliary classes 480 or to the client auxiliary classes 350. For instance, the Vkeys class may be reserved only as a client auxiliary class 350.

Figure 10:
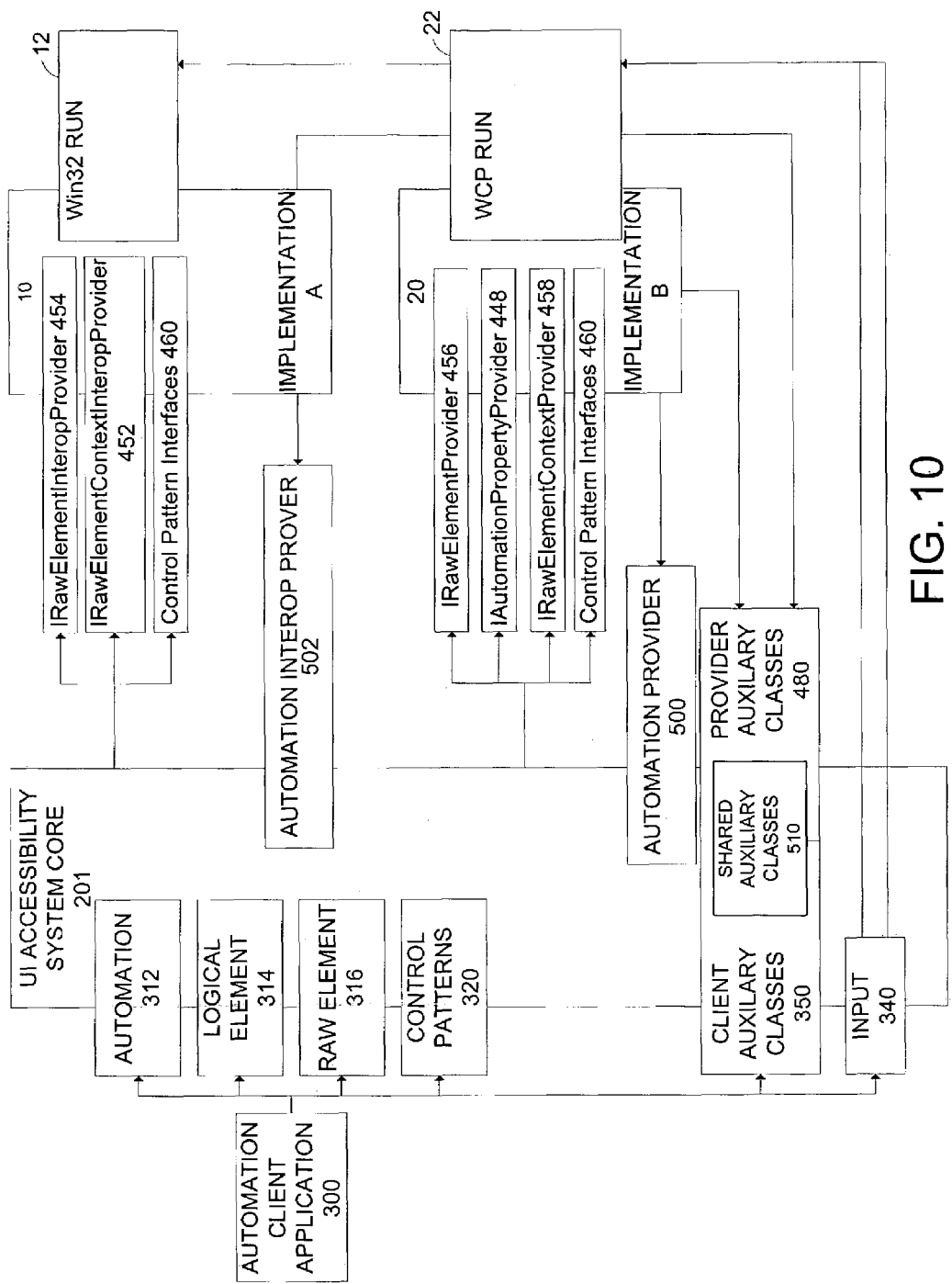
FIG. 10 is a diagram illustrating interaction between a client and a server using an embodiment of the accessibility system of the invention.
Figure 11:
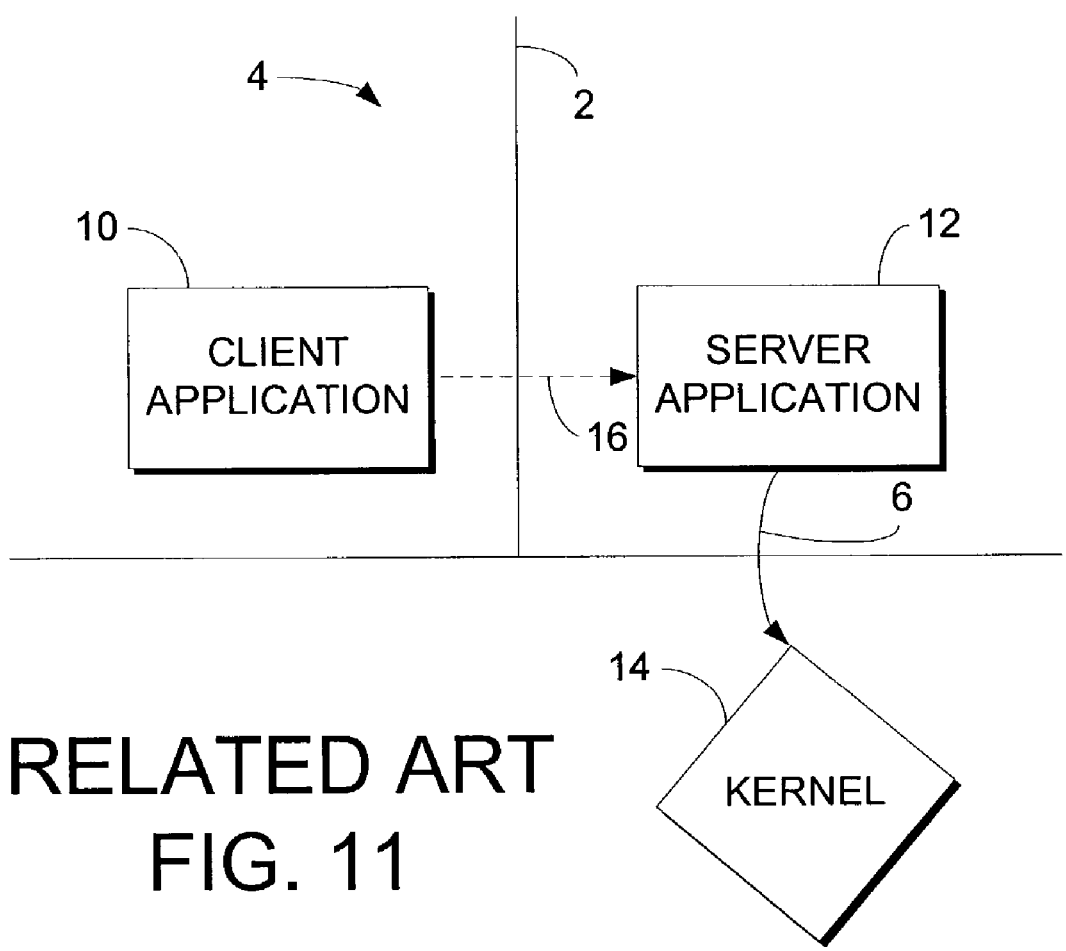
FIG. 11 shows a known system for event notification.

The provider automation classes 442 preferably include an automation interoperability provider (AutomationInteropProvider) class 502 as shown in FIG. 10. The AutomationInteropProvider class 502 may contain methods used by the accessibility system 200 with Win32 or $3^{rd}$ party Automation implementations. The AutomationInteropProvider class 502 contains the properties and methods used by Win32 or $3^{rd}$ party UI Automation provider-side implementations. The following table illustrates the AutomationInteropProvider class 502 in accordance with an embodiment of the invention.

TABLE 20 sealed class System.Windows.Automation.InteropProvider.
AutomationInteropProvider
    Properties:
        Boolean ClientsAreListening
        Int32 InvalidateLimit
        Int32 RootObjectID
    Methods:
        IRawElementProvider BaseRawElementProviderFromHandle ( IntPtr hwnd )
        LogicalElement LogicalElementFromLocal-
        Provider( IRawElementProvider localImpl )
        Void RaiseAutomationEvent(
            AutomationEvent eventId,
            IRawElementProvider element,
            AutomationEventArgs e )
        Void RaiseAutomationPropertyChangedEvent(
            IRawElementProvider element,
            AutomationPropertyChangedEventArgs e )
        Void RaiseFocusChangedEvent(
            IRawElementProvider element,
            FocusChangedEventArgs e )
        Void RaiseLogicalStructureChangedEvent(
            IRawElementProvider element,
            LogicalStructureChangedEventArgs e )
        IRawElementProvider RawElementProviderFromHandle( IntPtr hwnd )
        IntPtr ReturnRawElementProvider(
            IntPtr hwnd,
            IntPtr wParam,
            IntPtr lParam,
            IRawElementProvider el )

An automation provider (AutomationProvider) class 500 is a similar class that contains methods that may be used by the accessibility system 200 with the Windows Client Platform.

The provider side APIs 440 also include provider automation interfaces 448. The provider automation interfaces 448 may include an automation property interoperability provider (IAutomationPropertyInteropProvider) interface 447 that is implemented by Win32 or $3^{rd}$ party providers to expose additional properties over the properties that the accessibility system 200 exposes by default. The provider automation interfaces 448 may additionally include an automation property provider (IAutomationPropertyProvider) interface 449. This interface 449 is similar to the interface 447, but can be implemented by native Windows Client Platform providers to expose properties in addition to those properties exposed by the accessibility system 200 by default.

The provider raw element interfaces 450 may include a raw element provider (IRawElementProvider) interface 456. The IRawElementProvider interface 456 defines methods that are implemented by a Native Windows Client Platform, Win32 or 3$^{rd}$ party provider and called by the accessibility system 200 to return relative elements such as first child, last child, next sibling and parent and return specific or all native and UI Automation properties. The IRawElementProvider interface 48 further returns provider objects for control patterns. The IRawElementProvider interface 456 is implemented by the accessibility system 200 and interacts with the provider for functionality related to a specific element. An example of an embodiment of the IRawElementProvider interface 456 is provided in the table below.

TABLE 21 interface System.Windows.Automation.InteropProvider.
IRawElementProvider
    Properties:
    IRawElementProvider BaseRawElementProvider
    Rect BoundingRectangle
    IRawElementContextProvider Context
    String DebugString
    Methods:
    Boolean CompareNativeElement( Object nativeElement )
    Boolean GetFirstChild( IRawElementProvider& ret )
    Boolean GetLastChild( IRawElementProvider& ret )
    Void GetNativeProperties(
        GetNativePropertiesOptions options,
        String[ ]& names,
        Object[ ]& values,
        String[ ]& valueStrings )
    Object GetNativePropertyValue( String name )
    String GetNativePropertyValueAsString( String name )
    Boolean GetNextSibling( IRawElementProvider& ret )
    Boolean GetParent( IRawElementProvider& ret )
    Object GetPatternProvider( AutomationPattern iid )
    Boolean GetPreviousSibling( IRawElementProvider& ret )
    Object GetPropertyvalue( AutomationProperty idProp )
    Int32[ ] GetRuntimeID( )
    AutomationProperty[ ] GetSupportedProperties( )

An additional provider raw element interface 450 may include a raw element context interoperability provider (IRawElementContextInteropProvider) interface 452. The interface 452 may be implemented by Win32 or 3$^{rd}$ party provider. The interface 452 may be used to manage events and other functionality not related to any specific element. Yet an additional raw element interface 450 may include a raw element context provider (IRawElementContextProvider) interface 458 and may be implemented by a native Windows Client Platform provider and used to manage events and other functionality not related to any specific element. An embodiment of the IRawElementContextProvider interface 458 is illustrated in the table below.

TABLE 22 interface System.Windows.Automation.InteropProvider.
IRawElementContextProvider
    Properties:
    IRawElementProvider RootElementProvider
    Methods:
    Boolean AdviseEventAdded(
        AutomationEvent eventId,
        AutomationProperty[ ] properties )
    Void AdviseEventRemoved(
        AutomationEvent eventId,
        AutomationProperty[ ] properties )
    IRawElementProvider ElementProviderFromNative( Object nativeElement )
    IRawElementProvider ElementProviderFromPoint(
        Int32 x,
        Int32 y,
        Boolean& done )

TABLE 22-continued

IRawElementContextProvider[ ]
    GetEmbeddedContexts( IRawElementProvider rawElStartingPoint )
    IRawElementProvider GetFocus( Boolean& done )
    Boolean SetFocus( IRawElementProvider el )

The provider side APIs 440 may also include control pattern provider interfaces 460. Each control pattern has a provider interface 460 that is implemented by an object exposing the control pattern to the accessibility system 200. For example, an application window provider (IApplicationWindowProvider) interface exposes the behavior and information associated with the top-level window of an application. The control pattern provider interfaces 460 described below include interoperability provider (InteropProvider) interfaces that can be implemented by HWND based and 3$^{rd}$ party providers. The control pattern provider interfaces 460 also may include provider interfaces that can be implemented natively by Windows Client Platform providers.

The control pattern provider interfaces 460 may additionally include an application window provider (IApplicationWindowProvider) interface. The IApplicationWindowProvider or IApplicationWindowInteropProvider interface may expose the behavior and information typically associated with a top-level application window. This interface is typically implemented by providers to expose the functionality to manipulate the main window of an application.

The control pattern provider interfaces 460 may also include an expand and collapse provider (IExpandCollapseProvider) interface or ExpandCollapseInteropProvider interface. This interface may expose a control's ability to expand to display more content or collapse to hide content. The IExpandCollapseProvider interface may be supported in conjunction with the HierarchyItem pattern (described below) to provide tree-like behavior, but is also relevant for individual controls that open and close. UI elements such as toolbars, combo boxes, and menus may include relevant implementations.

The control pattern provider interfaces 460 may additionally include a grid provider (IGridProvider) interface or IGridInteropProvider interface. The IGridProvider interfaces expose basic grid functionality including grid size and movement of information to specified cells.

A grid item provider (IGridItemProvider) or IGridItemInteropProvider may provide an additional control pattern provider interface 460. The IGridItemProvider interface represents an item that is within a grid. The interface may include only properties without methods. The IGridItemProvider or IGridItemInteropProvider interface is implemented by providers to expose the functionality to manipulate a control that exposes the functionality of the cell in a grid.

The control pattern provider interfaces 460 may additionally include a hierarchy item provider (IHierarchyItemProvider) or IHierarchyItemInteropProvider interface. The IHierarchyItemProvider or IHierarchyItemInteropProvider interface exposes and allows clients 300 to traverse the hierarchical relationship between UI elements independently from their relationship in the logical tree 222. Hierarchy relationships are by definition noncircular. UI elements that may implement this interface include menus and list view controls.

An additional control pattern provider interface 460 may include an invoke provider (IInvokeProvider) or IInvokeInteropProvider interface. The invoke provider interface may be implemented by objects that have a single, unambiguous, action associated with them. These objects are usually stateless, and invoking them does not change their own state, but causes changes in the larger context of an application. UI elements that may implement the IInvokeProviderInterface include push buttons and hyperlinks menu items.

A multiple view provider (IMultipleViewProvider or IMultipleViewInteropProvider) interface provides an additional control pattern interface 460. The multiple view provider interface may expose an element's ability to switch between multiple representations of the same set of information, data, or children. This pattern should be implemented on the container which controls the current view of content.

The control pattern provider interfaces 460 may also include a range value provider (IRangeValueProvider) or (IRangeValueInteropProvider) interface. The range value provider interface may expose a related set of properties that reflect a control's ability to manage a value within a finite range. The interface may convey a control's valid minimum and maximum values and its current value. UI elements that may implement this interface include numeric spinners on a progress bar and scroll bars.

A scroll provider (IScrollProvider or IScrollInteropProvider) interface may be provided as an additional control pattern provider interface 460. The interface exposes a control's ability to change the portion of its visible region that is visible to the user by scrolling its content. This interface represents UI elements that scroll their content such as list boxes, tree views, or other containers that maintain a content area larger than the control's visible region. An embodiment of an IscrollInteropProvider interface is provided in the table below.

TABLE 23

```
interface System.Windows.Automation.InteropProvider.
IScrollInteropProvider
    Boolean Scroll(
        ScrollAmount horizontalAmount,
        ScrollAmount verticalAmount )
    Boolean ScrollIntoView(
        IRawElementProvider re,
        Boolean start )
    Boolean SetScrollPercent(
        Single horizontalPercent,
        Single verticalPercent )
```

An additional control pattern provider interface 460 includes a selection by identification provider (ISelectionByIDProvider or ISelectionByIDInteropProvider) interface. The interface represents a container element that offers a choice between the items it contains. The selection by identification provider interface is the provider side interface for controls that do not have logical element children. Clients will see the same methods as if the control did have logical elements as children. The interface is implemented to assist the provider in exposing the functionality to manipulate a elements in a container that can be selected and unselected. An embodiment of the interface is provided in the table below.

TABLE 24

```
interface System.Windows.Automation.InteropProvider.
ISelectionByIDInteropProvider
    Boolean AddSelectionIDToSelection( Int32 selectionID )
    String GetSelectionIDName( Int32 selectionID )
    Int32[ ] GetSupportedSelectionsIDs( )
    Boolean IsSelected( Int32 selectionID )
    Boolean RemoveSelectionIDFromSelection( Int32 selectionID )
    Boolean SelectElementBySelectionID( Int32 selectionID )
```

Control pattern provider interfaces 460 may also include a selection provider (ISelectionProvider or ISelectionInteropProvider) interface. The selection provider interface may represent containers that manage selection and is implemented by providers to expose the functionality to manipulate an element that contains elements that can be selected. An embodiment of the interface is shown in the following table.

TABLE 25

```
interface System.Windows.Automation.InteropProvider.
ISelectionInteropProvider
    Boolean AtLeastOneSelectionRequired
    IEnumerator Selection
    Boolean SupportsMuitipleSelection
    Boolean AddElementToSelection( IRawElementProvider el )
    Boolean IsSelectable( IRawElementProvider el )
    Boolean IsSelected( IRawElementProvider el )
    Boolean RemoveElementFromSelection( IRawElementProvider el )
    Boolean SelectElement( IRawElementProvider el )
```

Control pattern provider interfaces 460 may additionally include a selection item provider (ISelectionItemProvider or ISelectionItemInteropProvider) interface. The interfaces may define a selectable item and expose its functionality so that it can be selected and unselected.

The control pattern provider interfaces 460 may also include a sort provider (ISortProvider or ISortInteropProvider) interface. This interface may expose a container's current sort order and allow clients to programmatically re-sort its elements.

A value provider (IValueProvider or IValueInteropProvider) interface may be implemented by the contol pattern provider interfaces 460 to represent and manipulate elements that have an associated value.

A visual information provider (IVisualInformationProvider or IVisualInformationInteropProvider) interface may be included with the control pattern provider interfaces 460 to express information about an image or an animation that is conveying information to the user.

A window provider (IWindowProvider or IWindowInteropProvider) interface may also be included with the control pattern provider interfaces 460. This interface can expose an element's ability to change its on-screen position or size, as well as change the visual state and close it. An example of this interface is provided in the table below:

TABLE 26

```
interface System.Windows.Automation.InteropProvider.
IWindowInteropProvider
    Void Close( )
    Boolean MoveTo(
        Int32 x,
        Int32 y )
    Boolean Resize(
        Int32 width,
        Int32 height )
    Boolean SetVisualState( WindowVisualState state )
```

The provider side APIs 440 may also include auxiliary classes 480. The auxiliary classes 480 may be substantially identical to those utilized within the client side APIs 305. As described above, the client and the provider may share auxiliary classes. This feature is further described in connection with FIG. 10.

FIG. 10 shows the interaction between the client side APIs 305, the accessibility system core 200, and the server side APIs 440. The client application 300 implements the automation class 312, the logical element class 314, the raw element class 316 or the control patterns class 320 in order to obtain information through the accessibility system core 201. The client application 300 may also implement client auxiliary classes 350 and the input class 340.

FIG. 10 illustrates provider side APIs 440 in conjunction with an implementation A (10) using Win32 Run 12 and an implementation B (20) using WCP run. Implementation A uses the automation interop provider interface 502, raw element provider interface 456, the raw element context interop provider interface 452, and the control pattern interfaces 460 as needed. Implementation B uses the automation provider 500, the raw element provider interface 456, the automation property provider interface 448, the raw element context provider interface 458, and the control pattern interfaces 460 as required. Both implementations 10 and 20 may utilize provider auxiliary classes 480. As set forth above, the provider auxiliary classes may be substantially the same as the client auxiliary classes 350 or may share types with the client auxiliary classes 350 as shown by shared auxiliary classes 510. As set forth above, the shared auxiliary classes 510 may include types that the client and provider share for communicating information such as property identifiers, pattern identifiers, and event identifiers.

In operation, the client side APIs 305 allow the client 300 to get to the logical tree. Functionality includes: (1) logical element from point to point; (2) logical element from event; and (3) currently focused logical element. As set forth above, a logical element represents a UI component, possibly a control, a part of a control, or a container or logical grouping (i.e. dialog, pane, or frame). Controls can vary greatly in terms of their functionality. Accordingly, different interfaces are used to represent functionality associated with particular types of controls. However, these control-specific interfaces derive from a common base interface that represents functionality common to all controls. The common base interface contains the core classes 310, which include: (1) methods for navigating the logical tree 222; (2) a general method for getting property values; and (3) methods for accessing supported control-specific interfaces. In navigating the logical tree 222, each underlying application UI technology will provide its own technique for navigation.

To start using accessibility system events in an application, the client 300 can do one of several things: (1) Use the "AddTopLevelWindowEventHandler" method from the automation class 312 to discover new UI appearing on the desktop and in the handler for that event, register for other events and by this means receive events from any process; (2) Use one of the "Find" methods from the automation class 312 to locate interesting UI and target a specific piece of UI; (3) Use some other method from the automation class 312 to discover interesting UI such as finding a window handle or a point on the screen and, using that handle or point, acquire a logical element to use as a reference for listening to events; or (4) Use the "AddFocusChangedEventHandler" method of the automation class 312 to track the input focus and register for events on the UI that currently has focus.

The client side APIs 305 and the server side APIs 440 operate to fulfill the needs of the client 300. The following examples are provided to illustrate how the clients use the client side APIs 305 and how the server side APIs 440 are subsequently invoked to provide the client 300 with user interface information.

Top-level window events include events related to menus and combo box dropdowns or any feature having the desktop as a parent. In an embodiment of the invention, the AddTopLevelWindowEventHandler method is used to receive notification of top-level windows being opened and closed. Calling AddTopLevelWindowEventHandler will get notifications for new top-level windows opening or top-level windows being closed on the current desktop. A RemoveTopLevelWindowEventHandler method provides a mechanism to stop receiving notifications for top-level windows being opened, or closed, on the desktop. This method uses a callback object to identify this listener. Therefore, the object passed in to the RemoveTopLevelWindowEventHandler method is the same as that passed to AddTopLevelWindowEventHandler. A method is called from the provider side APIs 440 for each new, top-level window that is opened. Similarly, a method may be called by the accessibility system 200 once when a top-level window has closed. To receive these notifications, the client 300 calls the AddTopLevelWindowEventHandler method.

Another type of event is a focus event. Clients 300 often require a method for tracking focus. Doing this in the Microsoft Windows OS is difficult. For instance, when a menu is dropped down (e.g. the File menu in Microsoft Word) the items in the menu get focus as the user moves the cursor down each one. When the menu closes (e.g. the user presses the ESC key) today there is no focus event sent. Instead the client interested in focus changes must listen to a number of events and figure out which of those logically represents a focus change. In an embodiment of the invention, the AddFocusChangedEventHandler method from the automation class 312 may be used to notify the listener of focus change events. The client 300 may specify a set of properties to be returned with this and other event registration methods The client 300 may call the RemoveFocusChangedEventHandler method to stop receiving notifications for focus changes. This method may use the callback object to identify this listener and in this case the objects passed in to the RemoveFocusChangedEventHandler method will be the same as that passed to the AddFocusChangedEventHandler procedure. The accessibility system 200 may call a method such as RaiseFocusChangedEvent from the provider side automation class 442 when focus has changed in order to notify the client 300.

Property change events are fired when properties of logical elements change. In an embodiment of the invention, a client 300 calls an AddPropertyChangedEventHandler method from the automation class 312 to receive notifications for property changes. The accessibility system 200 invokes a provider side method from the provider side APIs 440 when the value of a property has changed on a logical element within the logical element tree specified in AddPropertyChangedEventHandler. A scope parameter indicates for what elements an event should be fired. For instance, passing the root logical element of a window and a request for descendants limits property change callbacks to that window. If the scope parameter is set to all elements in the tree, then the scope is ignored and any changes to the specified properties that occur on the desktop are sent. A client 300 may call AddPropertyChangedEventHandler multiple times with different sets of properties and/or a different callback object. The notification provided by the accessibility system 200 indicates: the property that changed; the new property value; and the old property value if available. A client 300 may call a RemovePropertyChangedEventHandler method to stop receiving notifications for property changes. This method may use the scope element and callback object to identify this listener and in this case the objects passed in must be the same as that passed to AddPropertyChangedEventHandler. The provider automation class 442 includes a RaiseAutomationPropertyChangedEvent method for informing the client 300 of automation property changes.

The AddAutomationEventHandler method from the client automation class 312 will enable the client 300 to receive events for controls. The scope parameter can be used to indicate for what elements to fire events. For instance, passing the root logical element of a window and requesting descendants will limit events to that window. If all elements in the tree are desired, then all events on the desktop will be sent. The RemoveAutomationEventHandler method may be used to stop receiving an event for controls. This method may use the scope element, callback object and an event identifier to identify the listener. In this case, the objects passed in must be the same as that passed to the AddAutomationEventHandler method. The provider automation class 442 includes a RaiseAutomationEvent method for informing the client 300 of events.

When a client application 300 has invoked the AddAutomationEventHandler method, the accessibility system 200 calls a method from the provider side APIs 440 when a control-specific event is fired and the source of the event is a logical element within the logical element tree specified in AddAutomationEventHandler. When events for controls are fired there is often event-specific information available. A RemoveAllEventHandlers method may be called to stop receiving any events. This is a quick way to clean up before a client application shuts down. The removal method may optimally be used when terminating an application.

Logical structure change events are fired when the logical element tree structure changes. An AddLogicalStructureChangedEventHandler method may be implemented to receive notifications for structural changes in the logical element tree. When logical elements are added, removed or invalidated, methods on the specified callback object are called. The RemoveLogicalStructureChangedEventHandler method may be called to stop receiving events for logical element tree changes. This method may use a callback object and a scope element to identify this listener and in this case the objects passed in must be the same as those passed to AddAutomationEventHandler. The provider automation class 442 includes a RaiseLogicalStructureChangedEvent method for informing the client 300 of logical structure changes The UI automation server or provider side APIs 440 include methods that the server or underlying UI engine may call to accomplish property change notifications. The server 400 may call these notification methods to generate the appropriate parameters when the UI changes.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages that are obvious and inherent to the system and method. It will be understood that certain features and sub-combinations are of utility and may be employed without reference to other features and sub-combinations. This is contemplated and with the scope of the claims.

What is claimed is:

1. A system of tools for use in an accessibility system that provides one or more clients with user interface information, the accessibility system including a client side for each of the one or more clients and a provider side, the system of tools comprising:

client side automation tools including a client automation class for seeking user interface information, the client automation class including logical element discovery tools and event registration tools, the event registration tools allowing the one or more clients to register to receive one or more user interface event notifications for user interface property changes, control structure changes, multimedia events, or a combination thereof, which thereby reduces cross-process calls; and provider side automation tools for providing the one or more clients with user interface information, the provider side automation tools including an automation provider class having tools for providing the one or more clients with event information, wherein, if the one or more clients register to receive the one or more user interface event notifications for a particular event and the event is associated with a user interface element visible to a user, monitoring a user interface for the particular event for which the one or more clients registered to receive the one or more user interface event notifications that matches the information request, filtering the user interface information in correspondence with the information request, creating a logical element tree based on the filtered user interface information, transmitting the logical element tree to place the logical element tree with the one or more clients requesting information, the one or more clients configured for users having disabilities, and exposing a form of the logical element tree to the end user that corresponds with the user interface being presented to the user thereby assisting the user to interact with an application.

2. The system of claim 1, further comprising client side logical element tools for representing a user interface element.

3. The system of claim 2, further comprising client side raw element tools for representing an element in a raw element tree.

4. The system of claim 1, further comprising a client side input class for providing methods for simulating input.

5. The system of claim 4, further comprising tools for simulating mouse input and keyboard input.

6. The system of claim 2, further comprising client side control pattern classes for allowing the client to interact with accessibility system control patterns.

7. The system of claim 6, wherein the client side control pattern classes include an application window pattern class for exposing information associated with a main window of an application.

8. The system of claim 6, wherein the client side control pattern classes include an expand and collapse pattern class for manipulating content that can be displayed and can be hidden.

9. The system of claim 6, wherein the client side control pattern classes include a grid item class for discovering if an item is part of a grid.

10. The system of claim 6, wherein the client side control pattern classes include a hierarchy item pattern class for representing UI elements that expose the hierarchal relationship between UI elements independent from their relationship in the logical tree.

11. The system of claim 6, wherein the client side control pattern classes include an invoke pattern class for representing objects having a single associated action.

12. The system of claim 6, wherein the client side control pattern classes include a multiple view pattern class for manipulating an element that can switch between multiple representations.

13. The system of claim 6, wherein the client side control pattern classes comprise a range value pattern class for exposing minimum and maximum values of a control.

14. The system of claim 6, wherein the client side control pattern classes comprise a scroll pattern class for manipulating an element that can alter visibility through scrolling.

15. The system of claim 6, wherein the client side control pattern classes comprise a selection pattern class for manipulating elements in a container that can be selected and unselected.

16. The system of claim 6, wherein the client side control pattern classes comprise a sort pattern class for manipulating a container element that can sort sub-elements.

17. The system of claim 6, wherein the client side control pattern classes comprise a value pattern class for representing user interface elements that express a value.

18. The system of claim 6, further comprising a window pattern class for manipulating a window on a user desktop.

19. The system of claim 1, further comprising auxiliary tools for performing additional functions.

20. The system of claim 1, further comprising a provider side automation interface for exposing additional properties.

21. The system of claim 1, further comprising a provider raw element interface for returning relative elements from a raw element tree.

22. The system of claim 1, further comprising control pattern provider interfaces for exposing behavior and information associated with defined control patterns.

23. A system of client side tools implemented in an accessibility system that provides a client with user interface information, the accessibility system including a mechanism for transferring user interface information from a provider side to the client side and a logical tree for selectively revealing user interface information, the client side tools comprising:
   a computer processor;
   a client side automation mechanism including a client automation class for seeking user interface event information from the provider side; and
   a client side logical element mechanism including a logical element class for representing a user interface element in the logical tree, the logical tree comprising a filtered view of an underlying structural hierarchy having only one or more user interface elements that are of interest to a client and visible to a user, wherein each of the one or more user interface elements represents a control, an item in a control, or a grouping structure, the logical tree being utilized to identify information related to an event, a state of a system, a location of an object, a control, or a combination thereof, the logical tree being created by locating native user interface elements of underlying technologies that include elements that exist for structure and implementation to create one or more native trees, combining the native elements to form a raw tree that contains elements representing an implementation structure of an underlying framework and that indicates an unprocessed logical tree, and creating the logical tree by eliminating the native elements in the raw tree regarding object information and properties which are determined to be uninteresting to the client.

24. The system of claim 23, wherein the client automation class comprises tools for adding an automation event handler and tools for removing the automation event handler.

25. The system of claim 23, wherein the client automation class comprises tools for adding an automation property changed event handler and tools for removing the automation property changed event handler.

26. The system of claim 23, wherein the client automation class comprises tools for adding a focus changed event handler and tools for removing a focus changed event handler.

27. The system of claim 23, wherein the client automation class comprises tools for adding a top level window event handler and tools for removing a top level window event handler.

28. The system of claim 23, wherein the client automation class comprises tools for adding a logical structure changed event handler and tools for removing the logical structure changed event handler.

29. The system of claim 23, wherein the client automation class comprises tools for finding a logical element and tools for finding a raw element.

30. The system of claim 23, further comprising a client side raw element class for representing an element in a raw element tree.

31. The system of claim 23, wherein the logical element class further comprising tools for obtaining all patterns supported by an element.

32. The system of claim 23, further comprising an input class for providing methods for simulating input.

33. The system of claim 32, wherein the input comprises mouse input and keyboard input.

34. A system of provider side tools implemented in an accessibility system that provides a client with user interface information, the accessibility system including a mechanism for transferring user interface information from the provider side to the client and a logical tree for selectively revealing user interface information, the provider side tools comprising:
   a computer processor;
   a provider side automation class including tools for providing user interface event notifications to the client, the user interface event notifications indicating user interface property changes, control structure changes, multimedia events, or a combination thereof wherein, if the client requests information for a particular event and the event is associated with a user interface element visible to a user, monitoring a user interface for the particular event that matches the information request, filtering the user interface information in correspondence with the information request, creating a logical element tree based on the filtered user interface information, and transmitting the logical element tree to place the logical element tree with the client requesting information, the client configured for users having disabilities;
   a provider side automation interface for exposing user interface properties;
   a raw element interface for returning information related to a specific relative element; and
   a raw element context interface for managing events and functionality not related to a specific element.

35. The system of claim 34, wherein the provider side automation class includes a tool for raising an automation event.

36. The system of claim 34, wherein the provider side automation class includes a tool for raising a property changed event.

37. The system of claim 34, wherein the provider side automation class includes a tool for raising a focus changed event.

38. The system of claim 34, wherein the provider side automation class includes a tool for raising a logical structure changed event.

39. The system of claim 34, further comprising control pattern provider interfaces.

40. The system of claim 39, wherein the control pattern provider interfaces include an application window provider interface for exposing behavior and information associated with a top level application window.

41. The system of claim 39, wherein the control pattern provider interfaces include an expand and collapse interface for hiding and displaying content.

42. The system of claim 39, wherein the control pattern provider interfaces include a grid provider interface for exposing basic grid functionality.

43. The system of claim 39, wherein the control pattern provider interfaces include a hierarchy item provider interface for allowing the client to traverse a hierarchical relationship between user interface elements.

44. The system of claim 39, wherein the control pattern provider interfaces include an invoke provider interface for use by objects that perform a single action.

45. The system of claim 39, wherein the control pattern provider interfaces include a multiple view provider interface for exposing a capability of an object to switch between multiple representations.

46. The system of claim 39, wherein the control pattern provider interfaces include a range value provider interface for exposing a set of properties allowing an ability to manage a finite range of values.

47. The system of claim 39, wherein the control pattern provider interfaces include a scroll provider interface for exposing an ability to change a visible region.

48. The system of claim 39, wherein the control pattern provider interfaces include a selection by identification provider for exposing an element that offers a choice between items.

49. The system of claim 39, wherein the control pattern provider interfaces include a selection provider interface for representing a container that manages selection.

50. The system of claim 39, wherein the control pattern provider interfaces include a window provider interface for exposing an ability to change size and position.

51. An application program interface system for providing user interface information to a client through an accessibility system, the accessibility system including a mechanism for transferring user interface information from a provider side to the client side and a logical tree for selectively revealing user interface information, the application program interface system comprising:
  a computer processor;
  client side application program interfaces for assisting the client in obtaining user interface information, wherein the client side application program interfaces include an automation class, a raw element class; control pattern classes, an input class, and a logical element class for representing a user interface element in the logical tree, the logical tree comprising a filtered view of an underlying structural hierarchy having only one or more user interface elements that are of interest to a client and visible to a user, wherein each of the one or more user interface elements represents a control, an item in a control, or a grouping structure, the logical tree being utilized to identify information related to an event, a state of a system, a location of an object, a control, or a combination thereof, the logical tree being created by locating native user interface elements of underlying technologies that include elements that exist for structure and implementation to create one or more native trees, combining the native elements to form a raw tree that contains elements representing an implementation structure of an underlying framework and that indicates an unprocessed logical tree, and creating the logical tree by eliminating the native elements in the raw tree regarding object information and properties which are determined to be uninteresting to the client; and
  provider side application program interfaces for responding to client requests, the provider side application program interfaces comprising a provider automation class, a provider automation interface, a raw element interface, and control pattern provider interfaces.

52. The system of claim 51, further comprising auxiliary classes used by the provider side and the client side.

53. A computer-implemented method for providing user interface information to a client through an accessibility system, the accessibility system including a mechanism for transferring user interface information from a provider side to the client side and a logical tree for selectively revealing user interface information, the method comprising
  providing client side application program interfaces for assisting the client in obtaining user interface information, wherein the client side application program interfaces include an automation class, a raw element class, control pattern classes, an input class, and a logical element class for representing a user interface element in the logical tree, the logical tree comprising a filtered view of an underlying structural hierarchy having only one or more user interface elements that are of interest to a client and visible to a user, wherein each of the one or more user interface elements represents a control, an item in a control, or a grouping structure, the logical tree being utilized to identify information related to an event, a state of a system, a location of an object, a control, or a combination thereof, the logical tree being created by locating native user interface elements of underlying technologies that include elements that exist for structure and implementation to create one or more native trees, combining the native elements to form a raw tree that contains elements representing an implementation structure of an underlying framework and that indicates an unprocessed logical tree, and creating the logical tree by eliminating the native elements in the raw tree regarding object information and properties which are determined to be uninteresting to the client; and
  supplying provider side application program interfaces for responding to client requests, the provider side application program interfaces comprising a provider automation class, a provider automation interface, a raw element interface, and control pattern provider interfaces.

54. The method of claim 53, further comprising providing auxiliary classes for use by the provider side and the client side.

* * * * *

UNITED STATES PATENT AND TRADEMARK OFFICE
CERTIFICATE OF CORRECTION

PATENT NO. : 7,644,367 B2
APPLICATION NO. : 10/439514
DATED : January 5, 2010
INVENTOR(S) : McKeon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this

Sixteenth Day of November, 2010

David J. Kappos
*Director of the United States Patent and Trademark Office*